United States Patent
Tortorella et al.

(10) Patent No.: US 10,155,183 B2
(45) Date of Patent: *Dec. 18, 2018

(54) FILTRATION DEVICE AND METHOD

(75) Inventors: Stevan Paul Tortorella, Westborough, MA (US); Navin Deepal Pathirana, Piscataway, NJ (US); Geraint Seymour, Cardiff (GB)

(73) Assignee: GE HEALTHCARE UK LIMITED, Little Chalfont (GB)

( * ) Notice: Subject to any disclaimer, the term of this patent is extended or adjusted under 35 U.S.C. 154(b) by 1205 days.

This patent is subject to a terminal disclaimer.

(21) Appl. No.: 13/996,604

(22) PCT Filed: Dec. 20, 2011

(86) PCT No.: PCT/EP2011/073487
§ 371 (c)(1),
(2), (4) Date: Jun. 21, 2013

(87) PCT Pub. No.: WO2012/085007
PCT Pub. Date: Jun. 28, 2012

(65) Prior Publication Data
US 2013/0284680 A1    Oct. 31, 2013

(30) Foreign Application Priority Data

Dec. 21, 2010 (GB) .................................. 1021577.0
Dec. 21, 2010 (GB) .................................. 1021595.2
(Continued)

(51) Int. Cl.
*B01D 33/01* (2006.01)
*B01L 3/00* (2006.01)
*B01D 29/11* (2006.01)

(52) U.S. Cl.
CPC ............ *B01D 33/01* (2013.01); *B01D 29/118* (2013.01); *B01L 3/00* (2013.01); *B01L 3/502* (2013.01);
(Continued)

(58) Field of Classification Search
CPC ................. B01L 3/50255; B01L 3/508; G01N 2035/00465; G01N 2035/00475; G01N 2035/00485; B01D 29/118; B01D 33/01
(Continued)

(56) References Cited

U.S. PATENT DOCUMENTS 2,612,163 A * 9/1952 Norman ...................... 604/416
3,832,141 A   8/1974 Haldopoulos
(Continued)

FOREIGN PATENT DOCUMENTS

DE    26 37 273 A1    2/1978
DE    29 36 107 A1    3/1981
(Continued)

OTHER PUBLICATIONS

Japanese Office Action for JP Application No. 2013-545324 dated Nov. 17, 2015 (4 pages).

*Primary Examiner* — Jill A Warden
*Assistant Examiner* — Dwayne K Handy
(74) *Attorney, Agent, or Firm* — Eversheds Sutherland (US) LLP

(57) ABSTRACT

Embodiments of the present invention relate to a filtration device and method for filtering liquids. In conventional devices, a liquid is placed in a vial, and a plunger, having a filter membrane located at one end, is depressed into the vial, causing the liquid to pass through the filter membrane into the interior of the plunger, where it is stored until required for further processing. However, such plungers are typically made of a plastics material. It is undesirable to store the
(Continued)

filtered liquid in contact with plastics for extended periods of time, as contaminants may leach from the plastics material into the sample. In embodiments of the present invention, a filtrate receptacle made from a different material to the plunger, such as a glass material, is located in the interior of the plunger and the filtered liquid collected in the filtrate receptacle after passing through the filter membrane. This allows the filtered liquid to be held isolated from the plastics material, thereby protecting it from contamination.

25 Claims, 26 Drawing Sheets

(30) Foreign Application Priority Data

Dec. 21, 2010 (GB) .................................. 1021598.6
Jun. 28, 2011 (GB) .................................. 1110924.6

(52) U.S. Cl.
CPC ....... *B01L 3/508* (2013.01); *B01L 2200/0684* (2013.01); *B01L 2200/141* (2013.01); *B01L 2300/0681* (2013.01); *B01L 2300/0832* (2013.01); *B01L 2400/0478* (2013.01)

(58) Field of Classification Search
USPC .................... 422/422, 534, 535, 544, 547
See application file for complete search history.

(56) References Cited

U.S. PATENT DOCUMENTS

| | | | |
|---|---|---|---|
| 3,865,731 A | | 2/1975 | Seitz |
| 3,954,614 A | | 5/1976 | Wright |
| 3,969,250 A | * | 7/1976 | Farr .................. B01D 33/01 210/359 |
| 4,021,352 A | | 5/1977 | Sarstedt |
| 4,189,385 A | * | 2/1980 | Greenspan ............ B01D 33/01 210/136 |
| 4,210,623 A | | 7/1980 | Breno et al. |
| 4,510,058 A | | 4/1985 | Cais et al. |
| 4,522,713 A | | 6/1985 | Nussbaumer et al. |
| 4,895,808 A | * | 1/1990 | Romer ................ B01L 3/5082 210/662 |
| 4,953,561 A | | 9/1990 | Guirguis |
| 4,961,432 A | | 10/1990 | Guirguis |
| 5,356,814 A | | 10/1994 | Carrico, Jr. et al. |
| 5,499,751 A | | 3/1996 | Meyer |
| 5,686,665 A | | 11/1997 | Hara et al. |

FOREIGN PATENT DOCUMENTS

| | | |
|---|---|---|
| DE | 35 42 331 A1 | 6/1987 |
| DE | 91 12 165 U1 | 11/1991 |
| EP | 1 152 241 | 11/2001 |
| GB | 1 435 652 | 5/1976 |
| JP | 55-152435 | 11/1980 |
| JP | 02-102664 | 4/1990 |
| JP | 10-185780 | 7/1998 |
| JP | 2002-068262 | 3/2002 |
| JP | 2004-291838 | 10/2004 |

* cited by examiner

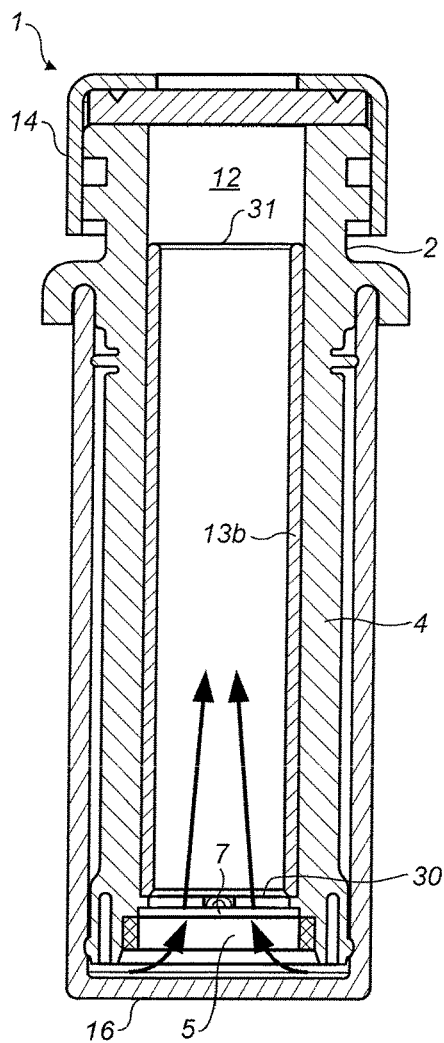
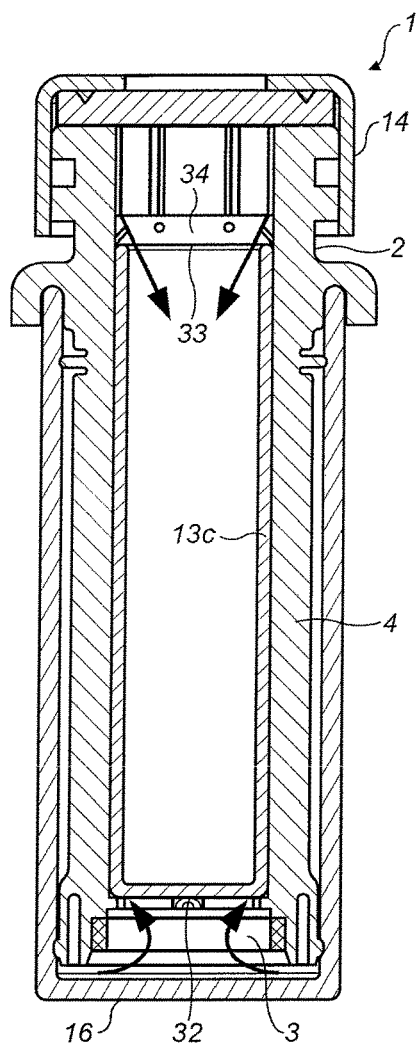
FIG. 5    FIG. 6a
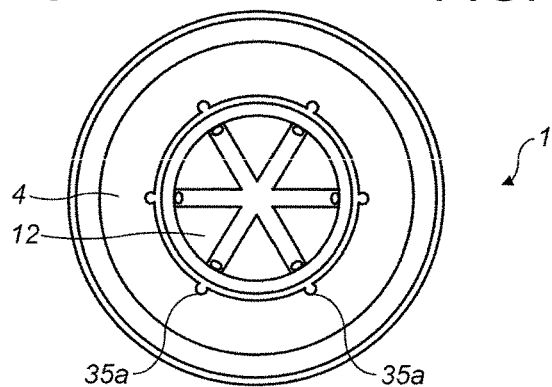
FIG. 6b

FILTRATION DEVICE AND METHOD

CROSS-REFERENCE TO RELATED APPLICATIONS

This application is a filing under 35 U.S.C. 371 of international application number PCT/EP2011/073487, filed Dec. 20, 2011, published on Jun. 28, 2012 as WO 2012/085007, which claims priority to application numbers 1021577.0 filed in Great Britain on Dec. 21, 2010, 1021598.6 filed in Great Britain on Dec. 21, 2010, 1021595.2 filed in Great Britain on Dec. 21, 2010 and 1110924.6 filed in Great Britain on Jun. 28, 2011.

FIELD OF THE INVENTION

The present invention relates to filtration devices and methods for filtering liquid samples and in particular to filtration devices such as plunger assemblies including a filter material, which are inserted into a liquid receptacle, such as a vial, containing a liquid to be filtered.

BACKGROUND OF THE INVENTION

Filtration devices comprising a hollow plunger which slides within a hollow tubular vial are frequently employed in laboratory and other environments to remove solids from a liquid sample. For example, biological samples such a blood, mucus or urine may be filtered (to remove contaminants or unwanted protein for example), the filtrate being subsequently used to perform medical or other tests.

In such devices, the hollow plunger typically has an aperture at one end, which is fitted with a filter membrane. The liquid sample to be filtered is initially held in the tubular vial, which is open at one end and closed at the other. The hollow plunger is inserted into the tubular vial, fitting tightly therein, so that a sealing contact is formed between the exterior of the hollow plunger and the interior of the tubular vial. The hollow plunger is then depressed into the tubular vial, with the sealing contact forcing the liquid sample through the filter membrane and into the interior of the hollow plunger. The filtrate is then held inside the plunger, until it is required for subsequent processing. The plunger may be fitted with a cap to prevent the filtrate escaping. When the filtrate is required, the cap may be pierced using a syringe or other device in order to extract the filtrate. U.S. Pat. No. 4,800,020 describes an example of a filtration device of this type.

Hollow plungers and tubular vials of this kind are typically made from, or contain parts made from, a plastics material. Plastics materials are convenient for this purpose because they are relatively cheap and can easily be formed (for example, by injection moulding) with the required dimensions to a relatively high degree of accuracy and with relatively complicated surface features, where required. Furthermore, plastics materials are generally relatively flexible, and therefore resistant to breakage, for example on insertion of the hollow plunger into the tubular vial.

However, plastics materials are often susceptible to leaching by the liquid sample, either prior to or subsequent to filtration, resulting in the liquid sample being contaminated with impurities from the plastics material. This is especially problematic when the liquid sample remains in contact with the plastics material for a prolonged period of time. In particular, it is often desirable or necessary to store the sample for several hours or days (e.g. 72 hours) after filtration, whilst the sample is transported to and processed at a laboratory for example, during which time the liquid sample remains in constant contact with the interior of the hollow plunger, resulting in significant contamination of the liquid sample.

It is an object of the present invention to at least mitigate some of the problems of the prior art.

SUMMARY OF THE INVENTION

In accordance with a first aspect of the present invention, there is provided a filtration device for use with a liquid receptacle for holding a liquid sample, the liquid receptacle having a closed end for holding said liquid sample, the filtration device comprising:

a plunger body made of a first material, the plunger body comprising an internal chamber;

a filter material; and a filtrate receptacle within the internal chamber of the plunger, the filtrate receptacle being made of a second material, the second material being different from the first material, wherein the filtration device is arranged to be slidably movable in the liquid receptacle so that the filter material moves towards said closed end of the liquid receptacle, wherein said movement causes liquid held in said liquid receptacle to pass through said filter material to the internal chamber of the plunger, thereby filtering the liquid, the filtered liquid passing into said filtrate receptacle.

By using a filtrate receptacle made of a different material to that of the plunger to collect the filtered liquid, the filtrate can be kept at least partly isolated from the material of the plunger. Accordingly, the plunger body can be made of a material, such as a plastics material, which can easily be formed, for example by moulding, but which may contaminate the filtrate, due to leaching for example, if the filtrate is stored on contact with the plunger body. This reduces the risk of contamination of the sample, and allows the filtrate to be stored inside the filtration device without being contaminated for longer periods of time than is possible with prior art devices.

Preferably, the second material is more inert (i.e. less susceptible to leaching by the filtrate) than the first material. The second material may comprise a glass or ceramic material.

In some embodiments, the filtrate receptacle comprises opposing open ends, at least one of the open ends being arranged to receive the filtered liquid sample from said filter material. The filtrate receptacle may comprise a hollow cylinder open at each end. Since the filtrate receptacle is open at both ends, the filtrate can be easily accessed, for example using a syringe, when required for subsequent processing.

In some embodiments, the filtration device comprising one or more conduits, the one or more conduits being fluidly connected to said filter material to receive filtered liquid sample therefrom, the one or more conduits being arranged such that filtered liquid passing therethrough is collected in said filtrate receptacle. Using these conduits enables the filtered liquid to be conveyed into the filtrate receptacle and collected therein in complete isolation from the plunger body.

The one or more conduits may comprise a tube extending in the interior of the filtrate receptacle. The filtrate receptacle may be substantially cylindrical, with the tube extending along an axis of the filtrate receptacle.

Additionally or alternatively, the filtrate receptacle may comprise an open end and an opposing closed end, the closed end being located facing said filter material, and the one or more conduits may extend around a periphery of the filtrate receptacle, thereby fluidly connecting the filter material to said open end. The closed end of the filtrate receptacle ensures that the filtrate is kept in complete isolation from the plunger body; the open end enables the filtrate to be easily accessible, for example using a syringe for subsequent processing.

The one or more conduits may comprise one or more channels in an internal wall of the plunger body. In some embodiments, each of the one or more channels comprises an opening arranged to provide liquid to the filtrate receptacle during said movement, the opening being angled inward from the internal wall so as to direct liquid towards the open end of the filtrate receptacle. This ensures that the filtered liquid is channeled into the filtrate receptacle, and does not travel to the upper part of the filter assembly, where it may escape to the exterior through a vent hole, for example.

Preferably, the filtration device comprises a stop portion extending inwards from said internal wall of the plunger body, the stop portion being arranged to limit movement of the filtrate receptacle within said internal chamber, so as to prevent the open end of the filtrate receptacle moving past the stop portion, wherein the stop portion comprises said opening. This prevents the filtrate receptacle from being forced upwards within the internal chamber during operation of the filtration device.

In some embodiments, the plunger body comprises an aperture, the filter material being located at the aperture. In some embodiments, the filtration device comprises:

a cap at an end opposing said aperture, the cap being arranged to provide an air-tight seal to prevent air from passing from said interior chamber to the exterior of the plunger body; and a vent hole connecting said internal chamber with the exterior of the plunger body, such that air may escape from said internal chamber during said movement.

Preferably, the filtration device comprises a channel extending in a wall of said internal chamber from a first position inside said internal chamber to said vent hole, the first position being more proximal to the cap than the vent hole. This enables and allows the internal chamber to be appropriately vented whilst increasing the volume of the internal chamber which can be used to store the filtered liquid In some embodiments, the plunger assembly comprises a sealing means for forming a seal between the plunger assembly and the liquid receptacle during said movement, the seal preventing liquid passing around a periphery of the plunger assembly during said movement.

Preferably, the sealing means comprises a flexible portion, the flexible portion being capable of flexing on insertion into the liquid receptacle to correspond to an internal cross-section of the liquid receptacle, the flexible portion exerting an outward force on an internal wall of the liquid receptacle during said movement, thereby forming the seal. Because the sealing means comprises a flexible portion which can flex to correspond to an internal cross-section of a liquid-receptacle, the filtration device can be effectively used with liquid receptacles having a range of internal cross-sections.

The flexible portion may comprise a flexible rib extending outwards from the plunger body, the flexible rib being capable of deflecting longitudinally relative to the plunger body, and inwards towards the plunger body during said movement. Alternatively, or additionally, the flexible portion may comprise a flexible skirt extending downwards from an end of the plunger body, the skirt being deflectable inwards. These flexible portions are easily formed during a moulding process.

Preferably the skirt forms a wall of a recess portion, the recess portion being arranged to receive liquid during said movement, the received liquid exerting an outward force on said skirt. The outward force due to the received liquid improves the strength of the liquid seal.

In accordance with a second aspect of the present invention, there is provided a filtration apparatus comprising a filtration device according to the first aspect of the present invention and a liquid receptacle. Preferably the liquid receptacle is made from glass. This further reduces contact between the liquid being filtered and a leachable surface.

Preferably, the liquid receptacle comprises an open end through which at least part of said plunger assembly may pass, and the open end comprises a tapered portion. The tapered portion facilitates insertion of the plunger assembly, and reduces risk of breakage of the liquid receptacle.

In accordance with a third aspect of the present invention, there is provided a method of filtering a liquid, comprising:

inserting a liquid sample into a liquid receptacle;

inserting a filtration device into the liquid receptacle, the filtration device comprising a plunger body and a filter material, the plunger body being made of a first material and comprising an internal chamber;

a filter material and an internal chamber;

depressing the plunger assembly into the liquid receptacle, thereby causing the inserted liquid sample to pass through said filter material and into a filtrate receptacle located within said internal chamber, the filtrate receptacle being made of a second material, the second material being different to the first material.

In accordance with a fourth aspect of the present invention, there is provided a filtration device having a plunger body of plastics for insertion into the receptacle, the plunger body having an internal chamber containing a filtrate receptacle of inert material for receiving the filtered sample.

In accordance with a fifth aspect of the present invention, there is provided a filtration device for extracting and filtering a sample from a liquid receptacle, the filtration device comprising:

a plunger body of a first material, the plunger body comprising an internal chamber;

a filter; and a filtrate receptacle in the internal chamber of the plunger body, the filtrate receptacle being of a second material, the second material being different from the first material, wherein, in use, insertion of the plunger body into a liquid receptacle causes a sample to be filtered by the filter and received by the filtrate receptacle.

Further features and advantages of the invention will become apparent from the following description of preferred embodiments of the invention, given by way of example only, which is made with reference to the accompanying drawings.

BRIEF DESCRIPTION OF THE DRAWINGS

FIG. 5 shows a side cross-sectional view of a filtration apparatus according to a second embodiment of the present invention;

FIG. 6a shows a side cross-sectional view of a filtration apparatus according to a third embodiment of the present invention;

FIG. 6b shows a cross-sectional view of conduit channels of a first type for use in the third embodiment of the present invention;

DETAILED DESCRIPTION OF THE INVENTION

Figure 1:
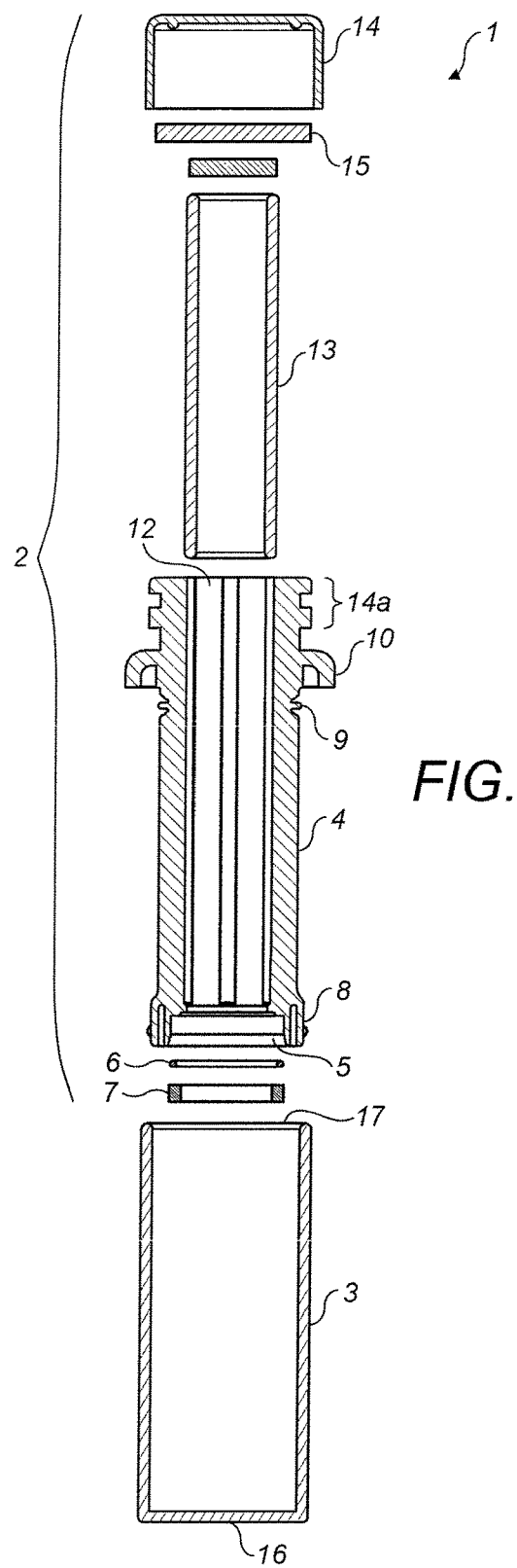
FIG. 1 shows an exploded cross-sectional view of a filtration apparatus in accordance with an embodiment of the present invention.

FIG. 1 shows an exploded cross-sectional view of a filtration apparatus 1 according to an embodiment of the invention. The filtration apparatus 1 includes a filtration device in the form of a plunger assembly 2 and a liquid receptacle, in the form of a vial 3, into which a liquid sample is placed prior to filtration.

The plunger assembly 2 comprises a plunger body 4, which has an aperture 5 at one end, in which is located a filter membrane 6, which may be held in the aperture 5 by a retaining ring 7; the retaining ring may affix the filter membrane by interference fitting or snap-fitting, for example. Alternatively, ultrasonic welding could be used to fix the retaining ring 7 to the aperture 5, thereby holding the filter membrane 6 in place.

The filter membrane 6 is typically a porous membrane having a pore size selected to allow the liquid sample 21 to pass through, but to filter out unwanted particles; a typical pore size is 0.2 μm to 0.45 μm. The filter membrane 6 may be constructed from polyethersulfone (PES), nylon or polypropylene, or any other suitable material.

The plunger body 4 further comprises a liquid seal 8, a vent seal 9 and a chamber seal 10 (these parts are described in more detail below).

The plunger body 4 is hollow, and comprises a chamber 12 in its interior. A filtrate receptacle 13 is located in the chamber 13 for receiving a filtered liquid sample, as described below. The plunger assembly 2 further includes a cap 14 and septa seal 15, which seal the chamber 12 at one end. The cap 14 is typically snapped onto ridges 14a on the plunger body 4. The cap 14 may alternatively or additionally be crimped to the plunger body 4 to improve the sealing properties of the cap 14.

The vial 3 is a hollow container, closed at a bottom end 16 and open at a top end 17. Herein, we use a convention in which the cap 14 is referred to as being located at the "top" of the of filtration apparatus 1, with the opposing end of the filtration apparatus 1 being referred to as the "bottom" of the filtration apparatus 1. Hence, the parts proximal to the cap 14 may be referred to as being located in the "upper" part of the filtration apparatus 1, with parts distal from the cap 14 being referred to as being located in the "lower" part of the filtration apparatus 1, and so on. This terminology is representative of a typical orientation of the filtration apparatus 1 in use and storage; however, it will be understood that the filtration apparatus 1 may be used or stored in any other orientation.

The vial 3 is typically a cylindrical tube; however, liquid receptacles 3 of non-circular (for example, elliptical or square) cross-section, may also be used. The plunger body 4 has an external cross-section arranged to correspond to the internal cross-section of the vial 3, so that the former may be inserted and slidably moved in the latter.

The plunger body 4 is typically made from a plastics material, such as Moplen EP300L or another medical grade polypropylene material, and may be manufactured using an injection moulding process. The filtrate receptacle 13 is made from an inert material, which is less susceptible to leaching by a liquid sample than the material from which the plunger body 12 is made. For example, the filtrate receptacle 13 may be made from a glass material, such as an HPLC glass (for example, borosilicate 33, 51 or 55), or a ceramic material.

The vial 3 may also be made of an inert material, such as any of those described above in relation to the filtrate receptacle 13. However, in some cases the vial 3 may be made from a plastics material, as is explained in more detail below.

The filtration apparatus 1 is typically sufficiently small to enable easy manual handling and operation. For example, the aperture 5 may have a diameter of approximately 6-7 mm or less; the walls of the plunger body 4 may have an external diameter of approximately 9-10 mm or less; the internal diameter of the vial 3 may be approximately 7.5-8.5 mm or less; the length of the plunger body may be approximately 30-35 mm or less. These dimensions are purely exemplary; filtration apparatuses 1 according embodiments of the present invention may be arranged according to any desired dimensions.

Figure 2A:
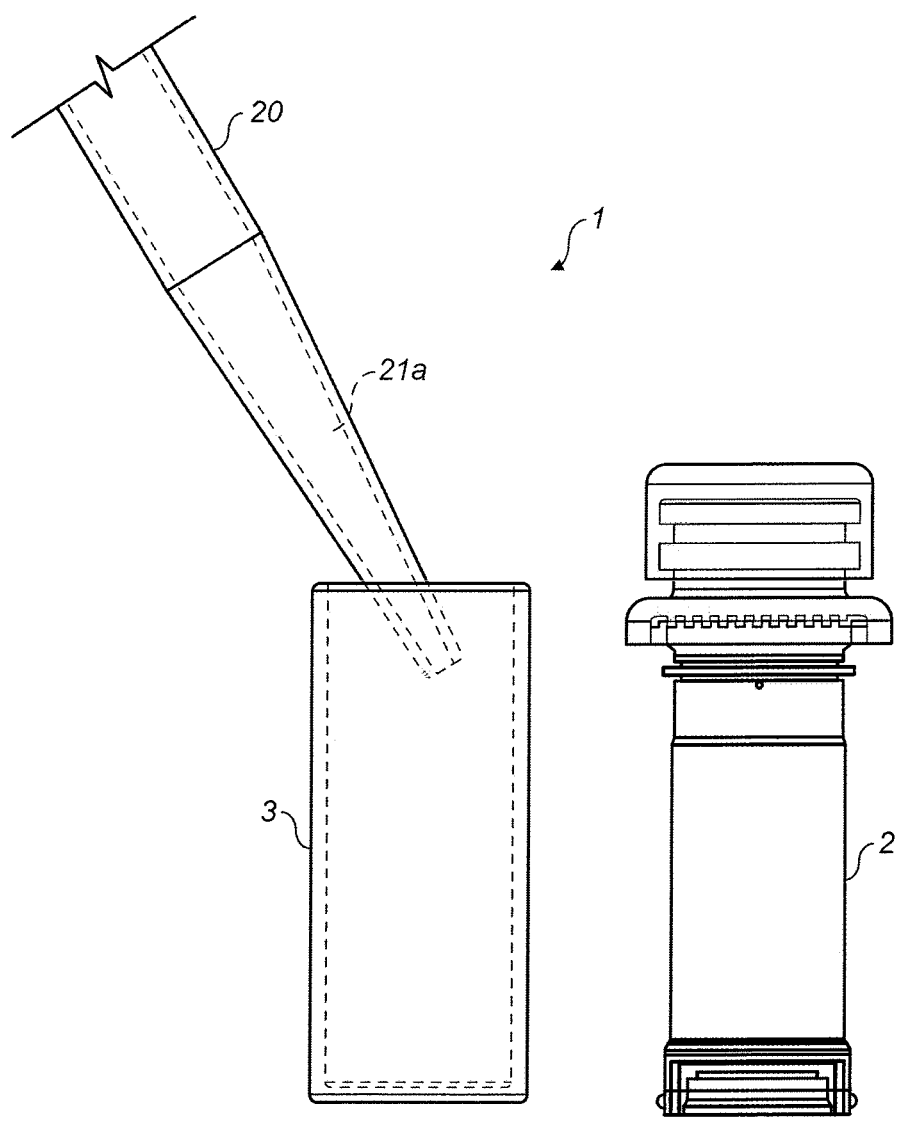
FIGS. 2*a* to 2*d* show external views of a filtration apparatus in use according to an embodiment of the present invention.

FIGS. 2a to 2d show external views of the filtration apparatus 1 at various stages of use in a filtration process according to an embodiment of the present invention. FIG. 2a shows the filtration apparatus 1 being prepared for use. A liquid sample 21a is inserted into the vial 3 using a pipette 20, for example, with the plunger assembly 2 being initially held separate from the vial 3.

Figure 2B:
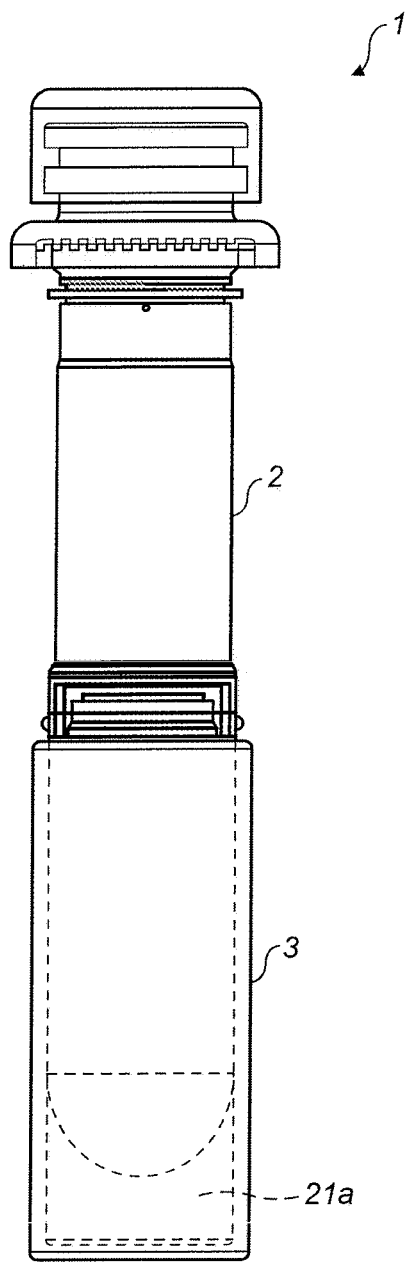
Figure 2C:
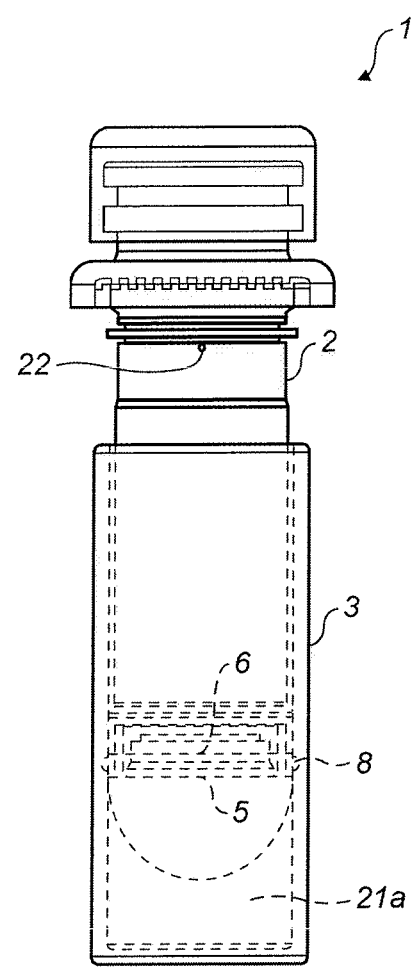

Next, the plunger assembly 2 is inserted into the open end 17 of the vial 3, as shown in FIG. 2b, and depressed so that it slides within the vial 3, so that the aperture 5 moves towards the closed end 16 of the vial 3, as shown in FIG. 2c. As the plunger assembly 2 moves within the vial 3, the liquid seal 8 engages with the interior walls of the vial 3, preventing the liquid sample from escaping around the edges of the plunger assembly 2. Accordingly, the liquid sample 21a is forced through the filter membrane 6 located at the aperture 5 of the plunger assembly 2, and into the chamber 12 in the interior of the plunger assembly 2, where it is collected in the filtrate receptacle 13. A vent hole 22 is located in a side wall of the plunger body 4, allowing air to escape from the chamber 12 in the interior of the plunger assembly 2 as the liquid sample 21 enters the chamber 12 via the aperture 5.

Figure 2D:
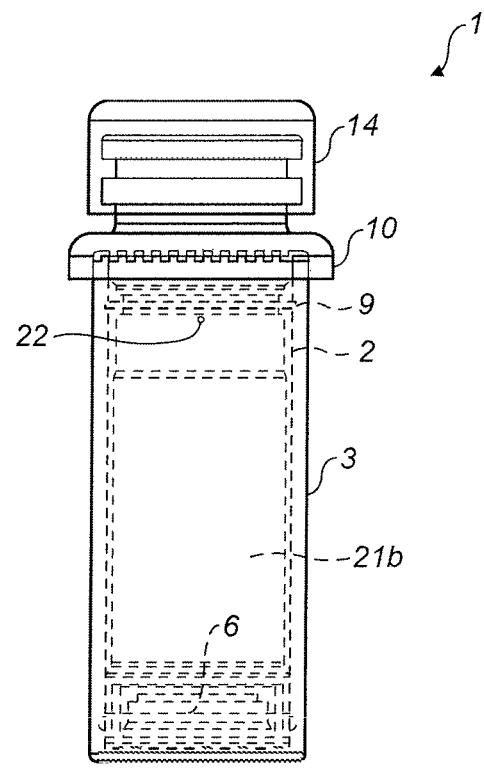

FIG. 2d shows the filtration apparatus 1 in a fully depressed state, in which the plunger assembly 2 is maximally inserted into the vial 3, and substantially all of the liquid sample 21a has passed through the filter membrane 6, and is stored as a filtrate 21b in the filtrate receptacle 13. In this configuration, the vent seal 9 has engaged with the internal walls of the vial 3, creating an air-tight seal, and the chamber seal 10 has engaged around the neck of the vial 3, creating a further air-tight seal; these air-tight seals prevent air escaping from the filtration apparatus 1, which in turn prevents evaporation of the liquid sample 21.

The process of filtering a liquid sample 21 described above with reference to FIGS. 2a to 2d may be performed manually. Alternatively, part or all of the process may be automated.

Figure 3:
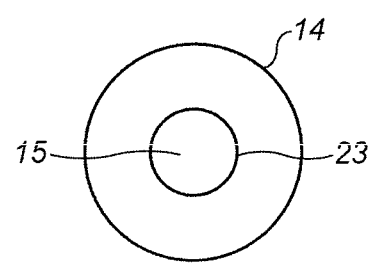
FIG. 3 shows a top view of a cap and septa seal for use in embodiments of the present invention.

The filtration apparatus 1 can be maintained in configuration shown in FIG. 2d until the filtrate 21b is required for further processing. The filtrate 21b can be accessed by piercing the septa seal 15 using, for example, a syringe. As shown in FIG. 3, which shows a top view of the cap 14, the cap 14 may have an opening 23 via which the septa seal 15 can be accessed by the syringe.

Since the filtrate 21b is held in the filtrate receptacle 13, the latter prevents the filtrate 21b from coming into contact with the plunger body 4, thereby preventing leaching of contaminants from the plunger body 4 to the filtrate 21b. The filtrate receptacle 13 is made of a different material to the plunger body 4; since filtrate receptacle can therefore be made from an inert material (i.e. a material not susceptible to leaching), the filtrate 21b can be stored for longer periods of time without becoming contaminated than is the case with prior art devices in which filtered liquid samples are held in contact with the interior of a plastic plunger.

Figure 4A:
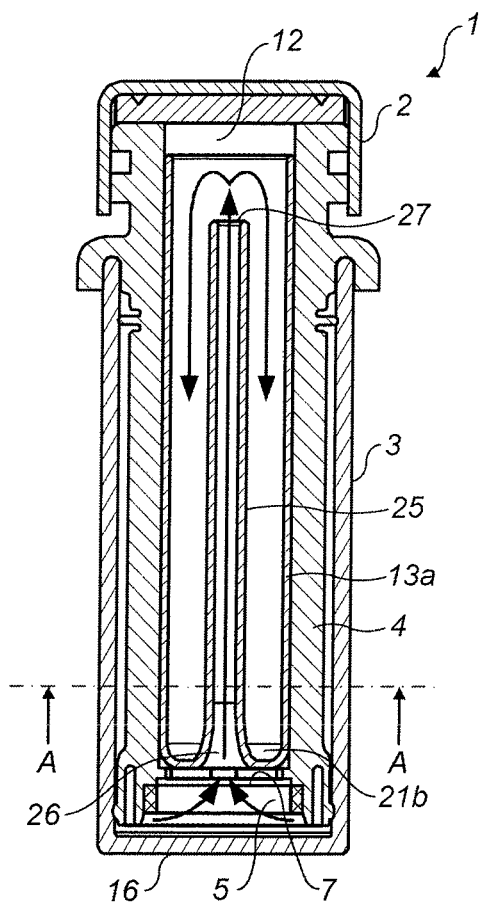
FIG. 4a shows a side cross-sectional view of a filtration apparatus according to a first embodiment of the present invention.

We now turn to describing exemplary filtrate receptacles 13 for use in embodiments of the present invention. FIG. 4a shows a cross-sectional side view of filtration apparatus 1 using a first exemplary filtrate receptacle 13a, which includes a conduit in the form of an axial capillary channel 25 extending along an axis of the filtrate receptacle 13a. Filtrate receptacles having an axial capillary channel 25 are referred to herein as "axial capillary receptacles" 13a. The axial capillary channel 25 is open at a first end 26 facing the aperture 5 of the plunger body 4, enabling it to receive liquid sample 21 from the aperture 5. The axial capillary channel 25 extends from the first end 26 along an axis in the interior of the axial capillary receptacle 13 to a second end 27, which is also open, and is located in the interior of the axial capillary receptacle 13a. The axial capillary channel 25 thus fluidly connects the aperture 5 to the interior of the axial capillary receptacle 13a.

Figure 4B:
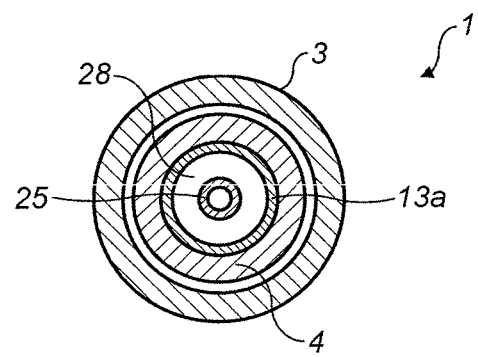
FIG. 4b shows a top cross-sectional view of a filtration apparatus according to the first embodiment of the present invention.

The axial capillary receptacle 13a is held tightly in place in the internal chamber 12 of the plunger body 4 using, for example, an interference fit, with the exterior walls of the axial capillary receptacle 13a forming a seal with the interior walls of the plunger body 4. Therefore, filtrate 21b passing through the filter membrane 6 as the latter moves towards the closed end 16 of the liquid receptacle 3 is prevented from passing around the sides of the axial capillary receptacle 13a, and is forced through the first end of the axial capillary channel 25, and along its length, as shown by the arrows in FIG. 4a. When the liquid sample 21 reaches the second end 27 of the axial capillary channel 25, it exits the axial capillary channel 25, and falls under the influence of gravity into the interior of the axial capillary receptacle 13a, where it collects in an annular area 28 around the periphery of the axial capillary channel 25, as shown in FIG. 4b, which is a cross-sectional top view of a filtration apparatus 1 using an axial capillary receptacle 13a, taken along section A-A of FIG. 4a. The filtrate 21b is thus kept completely isolated from plunger body 4, preventing contaminants leaching into the filtrate 21b whilst the sample is stored.

FIG. 5 shows a cross-sectional side view of a filtration apparatus 1 including a second exemplary filtrate receptacle 13b for use in embodiments of the present invention. The second exemplary filtrate receptacle 13b comprises a hollow tube open at both ends 30, 31. Filtrate receptacles which are open at both ends are referred to herein as "hollow tube receptacles" 13b.

The hollow tube receptacle 13b is held in place in the internal chamber 12 of the plunger body 4, forming a seal with the internal walls of the plunger body 4, as described above in relation to the axial channel receptacle 13a. Therefore, as the aperture 5 moves towards the closed end 16 of the liquid receptacle, liquid 21 passing through the aperture 5 passes through an open end 30 of the hollow tube receptacle 13b, located at the bottom of the hollow tube receptacle 13b facing the aperture 5, as shown by the arrows in FIG. 5. The filtrate 21b is therefore kept isolated from the interior walls of the plunger body 4, preventing leaching of contaminants from the plunger body 4. Further, since the hollow tube receptacle 13b is open and unobstructed at a top end 31, which opposes the bottom end 30 and faces the cap 14, the filtrate 21b can be easily removed from the hollow tube receptacle 13b using a syringe, for example, as described above. This may be particularly useful in the case of automated (e.g. robotic) processing, in which insertion of a syringe may be inhibited by the use of, for example, an axial capillary channel 25.

FIG. 6a shows a cross-sectional side view of a filtration apparatus including a third exemplary filtrate receptacle 13c for use in embodiments of the present invention. The third exemplary filtrate receptacle comprises a tube having a closed end 32 located at the bottom of the filtrate receptacle 13c, facing the aperture 5, and an opposing open end 33, located at the top of the filtrate receptacle 13c, facing the cap 14. Filtrate receptacles such as that shown in FIG. 6a which are open at one end and closed at another are referred to herein as "closed tube receptacles" 13c.

Since the closed tube receptacle 13c is closed at the end 32 facing the aperture 5, as the latter moves towards the closed end 16 of the vial 3, liquid sample passing through the aperture 5 is forced around the periphery of the closed tube receptacle 13c, as shown by the arrows in FIG. 6a. When the liquid sample 21 reaches the neck of the open end 33 of closed tube receptacle 13c it falls into the interior of the closed tube receptacle 13c under the influence of gravity; this may be facilitated by the use of a deflector ring 34, as is explained in more detail below.

Since the closed tube receptacle 13c is closed at the end 32 facing the aperture 5, the filtrate 21b is held in complete isolation from the plunger body 4; the closed tube receptacle 13c therefore provides the same advantages as the axial capillary receptacle 13a described above. Further, since the closed tube receptacle 13c is open and unobstructed at the end 33 facing the cap 14, the filtrate 21b can be easily removed from the closed tube receptacle 13c, as per the hollow tube receptacle 13b described above.

Figure 6C:
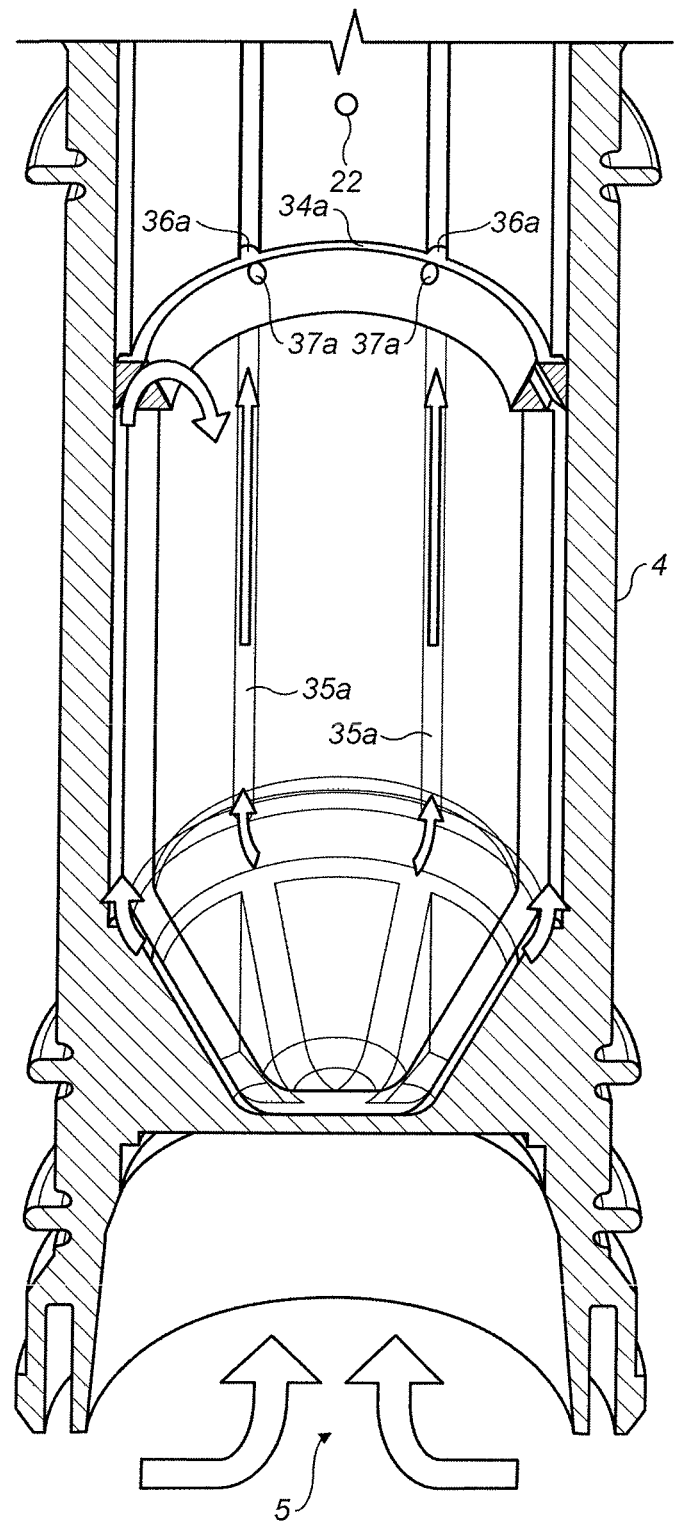
FIG. 6c shows a perspective cross-sectional view of a first plunger body for use in the third embodiment of the present invention.

In order to facilitate passage of the filtrate 21b around the closed tube receptacle 13c, one or more conduits in the form of peripheral channels 35a formed in the walls of the chamber 12, as shown in FIG. 6b, which shows a top cross-sectional view of a plunger assembly in accordance with an embodiment of the present invention, and FIG. 6c, which shows a perspective cross-sectional view of same. The peripheral channels 34a may be formed during moulding of the plunger body 4, or they may be cut into the plunger body 4 subsequent to moulding, for example.

The closed tube receptacle 13c may be held in place in the chamber 13 by an interference fit. The filtrate 21b is thus forced through the peripheral channels 35a and around the closed tube receptacle 13c; when the filtrate 21b passes beyond the open end 33 of the closed tube receptacle 13c, it falls under the influence of gravity into the closed tube receptacle 13c, as shown in FIG. 6c.

As mentioned above, a deflector ring 34 may be used to facilitate direction of the filtrate 21b into the closed tube receptacle 13c. The exemplary deflector ring 34a shown in FIG. 6c comprises a hollow ring that has protrusions, referred to herein as "legs" 36a arranged to correspond in profile with the peripheral channels 35a. The deflector ring 34a may be fitted by interference fit into the chamber 12 of the plunger body 4, with each leg 36a fitting into a peripheral channel 35a; alternatively, or additionally, the deflector ring 34a may be ultrasonically welded to the plunger body 4.

Each leg 36a includes an opening in the form of an angled hole 37a through which filtrate 21b flowing along the peripheral channels 35a is deflected. The holes 37a direct the filtrate 21b downwards into the closed tube receptacle 13c. This separates the filtrate 21b from any air that may be travelling concurrently through the peripheral channels 35a and, in particular, prevents the filtrate 21b from moving with air travelling towards and through the vent hole 22.

Figure 6D:
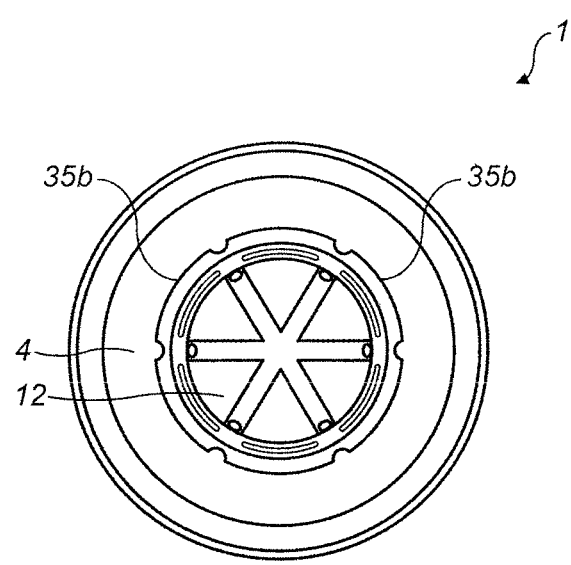
FIG. 6d shows a cross-sectional view of conduit channels of a second type for use in the third embodiment of the present invention.
Figure 6E:
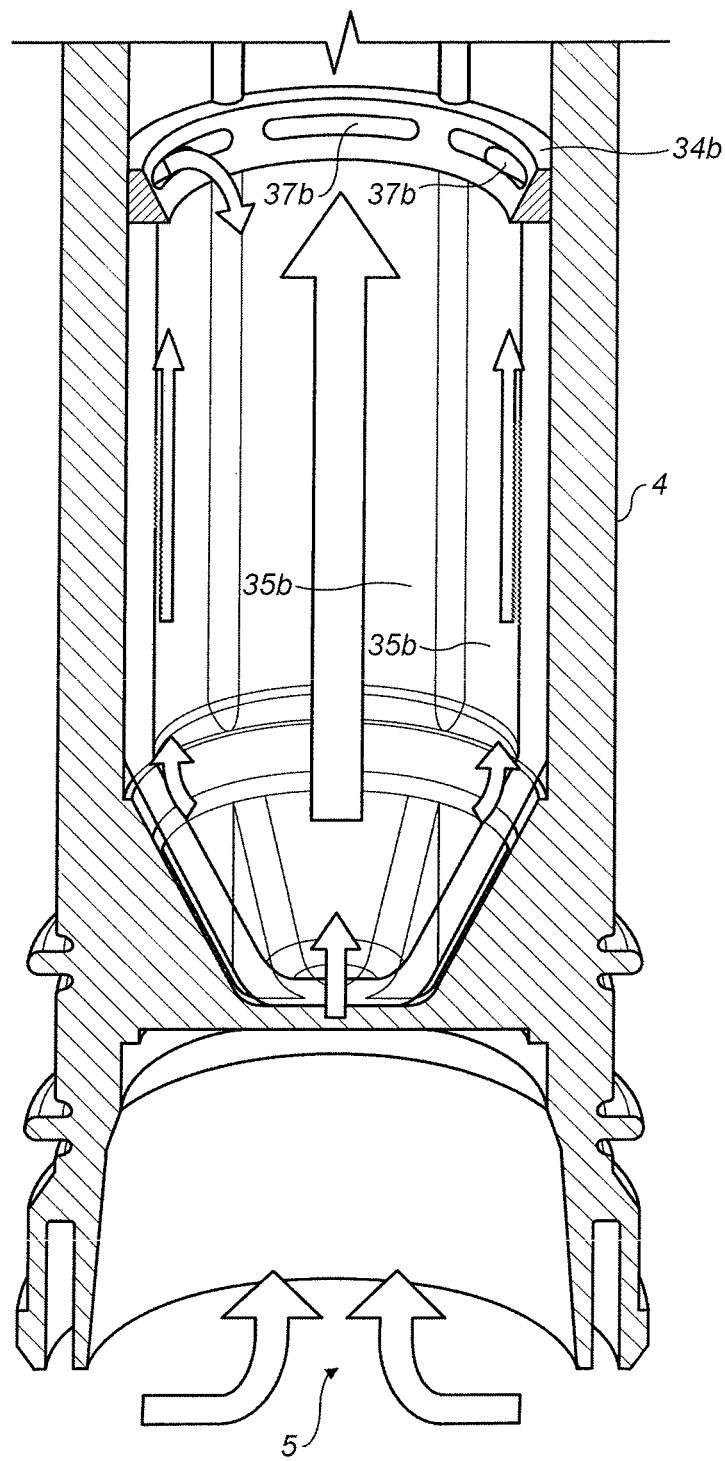
FIG. 6e shows a perspective cross-sectional view of a second plunger body for use in the third embodiment of the present invention.

FIGS. 6d and 6e show, respectively, a top cross-sectional view and a perspective cross-sectional view of an alternative arrangement of peripheral channels 35b and deflector ring 34b, in which the peripheral channels 35b and deflector ring openings 37b have larger respective cross-sectional areas than the corresponding features of FIGS. 6b and 6c. This enables a higher rate of flow of the liquid sample 21 through the peripheral channels 35b and openings 37b, improving ease of use and increasing the speed of filtration. The deflector ring 34b may also be fitted into the chamber 12 of the plunger body 12 using an interference fit, and/or ultrasonic welding.

In addition to deflecting the flow of the liquid sample, the deflector ring 34b may also act as a stop portion, limiting the movement of the closed tube receptacle 13c in the chamber 12. In cases where no interference fit (or other means) is used to hold the closed tube receptacle 13c in place, or if the interference fit is not effective (for example, due to variation in the diameters of closed tube receptacles 13c), pressure resulting from the liquid sample 21 as it moves through the filter membrane 6 may force the closed tube receptacle 13c to move upwards towards the cap 14. If the closed tube receptacle 13c moves to the top of the chamber 12, flow of the filtrate 21b around the periphery of the closed tube receptacle 13c may be inhibited. Accordingly, the deflector ring 34 may be arranged such that any upward movement is limited by the open end 33 of the closed tube receptacle 13c abutting the deflector ring 13, ensuring that the open end 33 of the closed tube receptacle 13c remains below the openings 37 in the deflector ring 13, and that the flow of the filtrate 21b around the periphery of, and into, the closed tube receptacle is not inhibited.

Figure 6F:
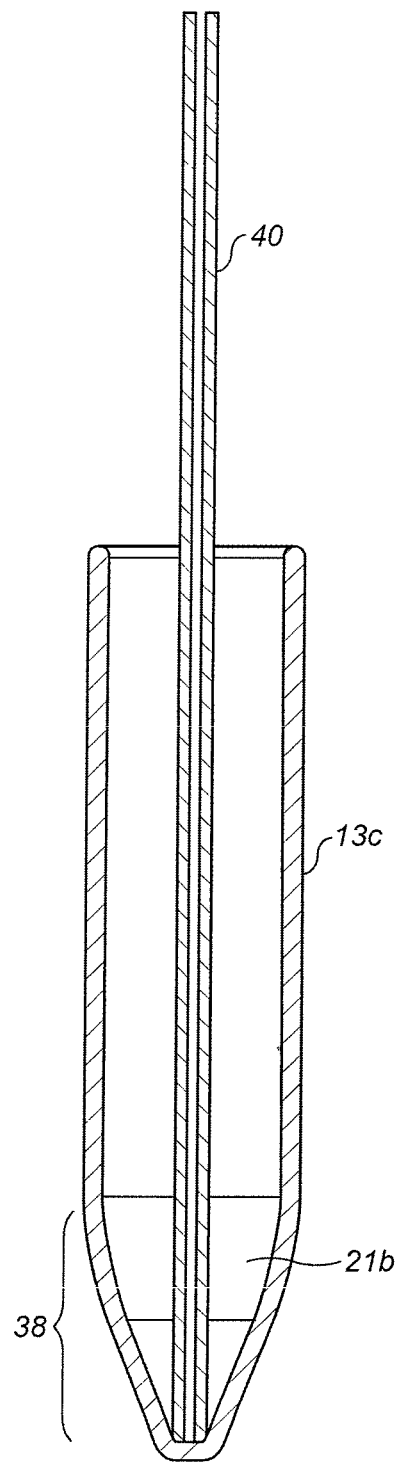
FIG. 6f shows a side cross-sectional view of a liquid receptacle for use with either of the first type and second type of the plunger body.

The plunger chambers 12 shown in FIGS. 6b and 6e have conically shaped bases, making them suitable for use with a closed tube receptacle 13b having a conical closed end 38, as shown in FIG. 6f. This shape may be particularly suitable for removal by a syringe needle 40 of the filtrate 21b from the closed tube receptacle 21, because the reduced diameter at the conical closed end 38 focuses the syringe needle 40 and the filtrate 21b into a small aperture. A further advantage of using a closed tube receptacle 13c with a conical closed end 38 is that the conical shape facilitates the passage of the filtrate 21b around the periphery of the closed tube receptacle 13c. Alternatively, a round ended shape would also facilitate the passage of the filtrate around the periphery of the closed tube receptacle 13c.

Figure 6G:
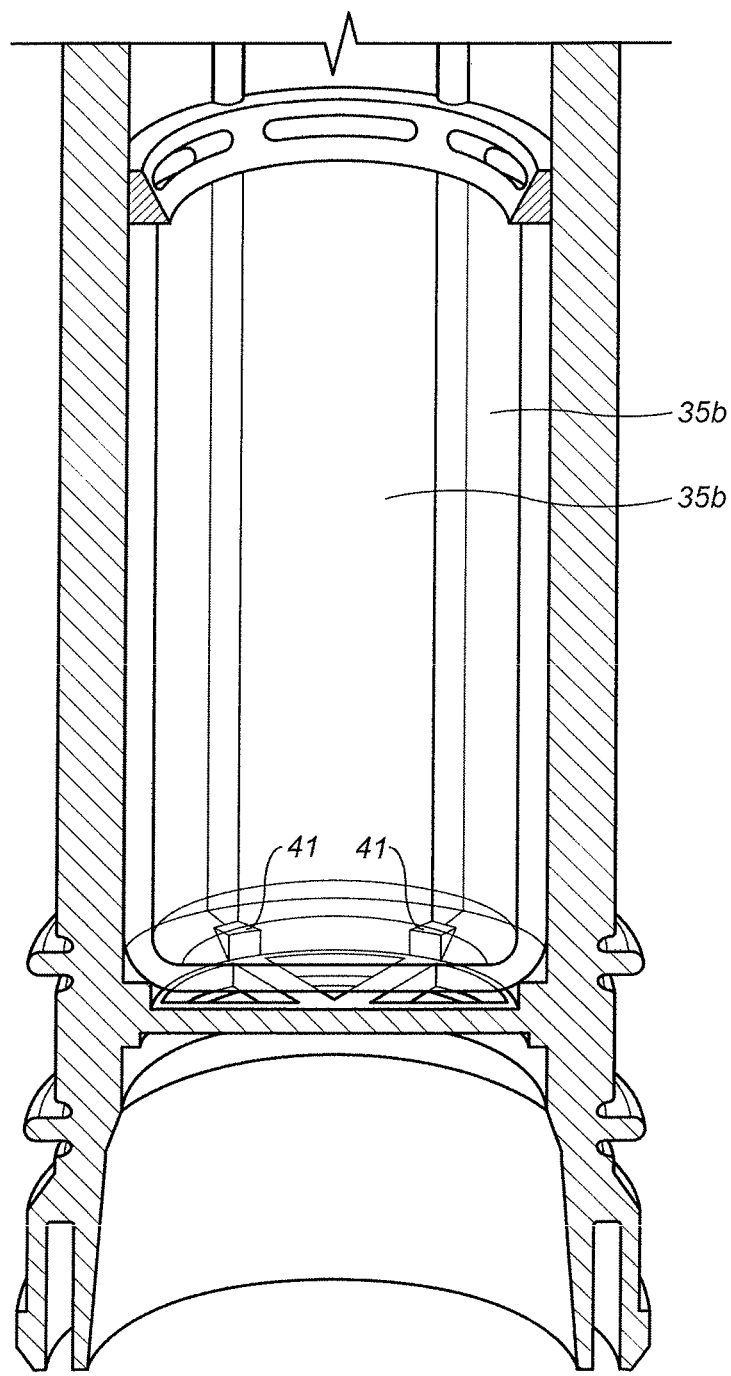
FIG. 6g shows a perspective cross-sectional view of a third plunger body for use in the third embodiment of the present invention.

However, in some cases, it is advantageous to use a flat bottomed closed tube receptacle 13c, because this maximises the internal volume of the closed tube receptacle 13c, which in turn maximises the amount of filtrate 21b that can be stored in a single closed tube receptacle 13c. FIG. 6g shows a plunger chamber 12 having a flat base, making it suitable for use with a flat-bottomed tube receptacle 13c. In this design, the closed tube receptacle 13c is located on protrusions in the form of pillars 41 at the base of the chamber 12. The pillars 41 ensure that a gap is maintained at the closed end 32 of the closed tube receptacle 13c, through which the filtrate 21b can pass along the peripheral channels 35b.

As described above, the vent hole 22 provides an outlet through which air may escape from the chamber 12 to the exterior of the plunger assembly 2 as the latter is depressed into the vial 3; in other words, the vent hole 22 allows air pressure built up inside the chamber during depression of the plunger assembly 2 to be relieved. It is desirable to arrange the vent hole 22 such that the air may escape through it, but such that liquid sample 21 may not. In embodiments of the present invention in which a deflector ring 34 is used, this may be achieved by simply locating the vent hole 22 above the position of the deflector ring 34, as shown in FIGS. 6c, 6e and 6g.

Figure 7A:
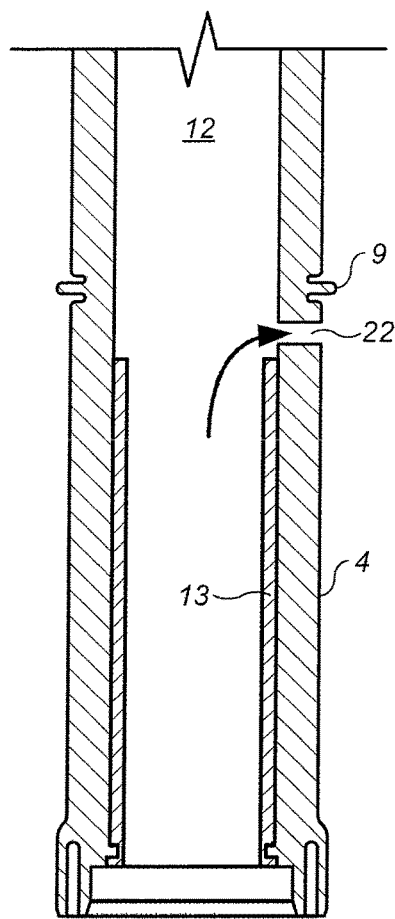
FIGS. 7a to 7c show cross-sectional views of vent hole arrangements for use in some embodiments of the present invention.

In embodiments of the present invention in which a bottom-filling filtrate receptacle 13 is used, such as the axial capillary receptacle 13a or the hollow tube receptacle 13b described above, the filtrate 21b may be prevented from passing through the vent hole 22 by similarly locating the vent hole above the upper end of the filtrate receptacle 13, as shown in FIG. 7a, in which the arrow shows the direction of travel of air as it escapes from the chamber 12.

However, the vent hole 22 must provide a point of exit from the chamber 12 located below the position of the vent seal 9 in order for the latter to be effective; accordingly, locating the vent hole 22 above the upper end of the filtrate receptacle 13 means that the size of the filtrate receptacle 13 is limited by the position of the vent seal 9 i.e. the filtrate receptacle 13 cannot occupy space in the chamber 12 above the location of the filter seal 9.

Figure 7B:
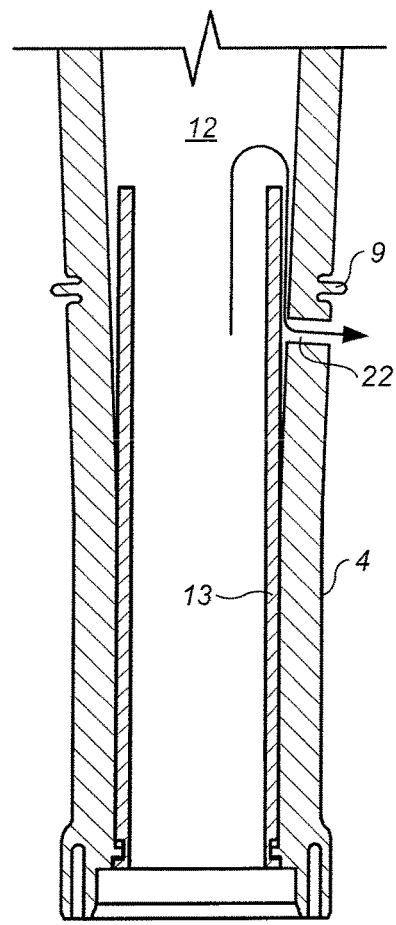

FIG. 7b shows an embodiment of the present invention arranged to address this issue; in FIG. 7b, the walls of chamber 12 are tapered so that there is a gap between the upper part of the filtrate receptacle 13 and the walls of the chamber 12 in the region of the vent hole 22. This allows air to escape through the top end of the filtrate receptacle 13, through the gap between the filtrate receptacle 13 and the chamber 12 walls, and through the vent hole 22. This enables the filtrate receptacle 13 to extend beyond the position of the vent hole 22, thereby enabling the filtrate receptacle 13 to occupy substantially all of the space within the chamber 12. In the arrangement shown in FIG. 7b, the gap between the filtrate receptacle 13 and the walls of the chamber 12 is formed due to a tapering of the chamber 12 walls; however, in some cases the gap may be formed by a tapering of the exterior walls of the filtrate receptacle 13.

Figure 7C:
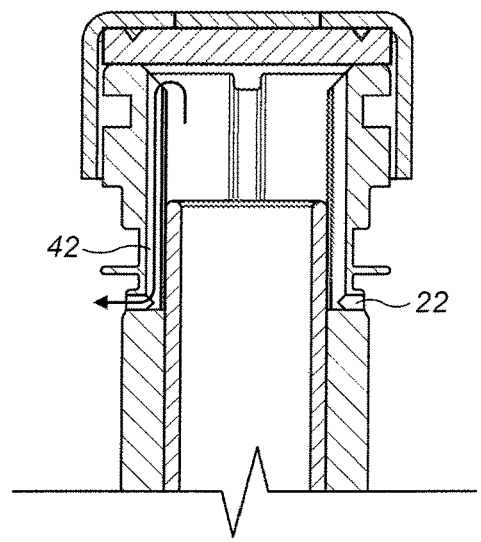

In a further embodiment of the present invention shown in FIG. 7c, an air channel 42 extends inside a wall of the chamber 12, and links the interior of chamber 12 at a position above the vent seal 9, to the vent hole 22, which is located below the vent seal 9, so that air may move from the chamber 12 to the exterior of the device, as shown by the arrow. This also enables the filtrate receptacle 13 to extend beyond the position of the vent hole 22, enabling the filtrate receptacle 13 to occupy substantially all of the space within the chamber 12.

As mentioned above, the filter seal 9 and the chamber seal 10 act, either individually or together, to seal the filtration apparatus 1 after the plunger assembly 2 is fully depressed in order to prevent evaporation of the filtrate 21b. The filter seal 9, which seals to the inner surface of the vial 3, may be thin in section and thus able to flex when the plunger assembly 2 is pushed into the vial 3; the vent seal 9 may comprise a flexible rib, as is described below in relation to FIGS. 9a and 9b. This flexibility enables the filter seal 9 to fit through the open end 17 of the vial 3 and to conform to the inside wall of the vial 3, avoiding the neck of the vial 3 being subjected to an excessive force, which may cause the vial 3 to break, particularly in cases when the vial 3 is made of a glass or other rigid material.

Figure 8A:
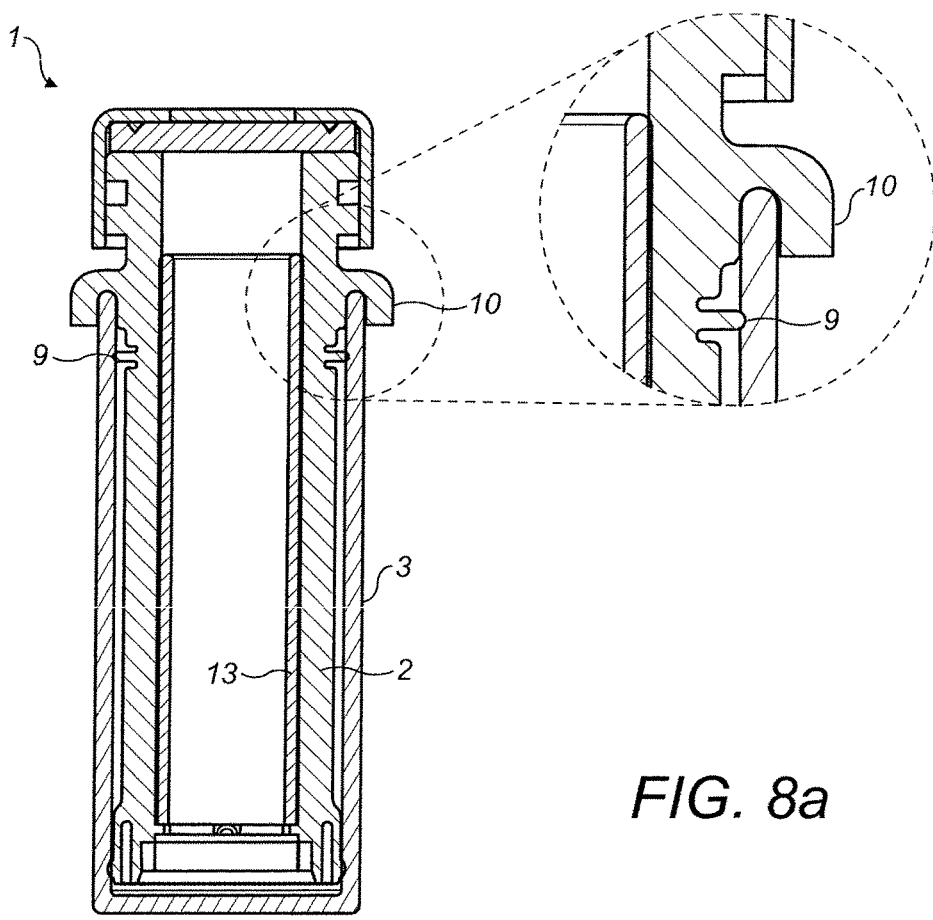
FIG. 8a shows a cross-sectional view of a chamber seal for use in some embodiments of the present invention.

FIG. 8a shows an exemplary chamber seal 10 for use in embodiments of the present invention. The chamber seal 10 is flexible and seals around the neck of the vial 3 when the plunger assembly 2 is fully depressed. There is a greater surface area of contact between the plunger assembly 2 and the vial 3, which may enables a more effective seal than is the case with the vent seal 9.

Figure 8B:
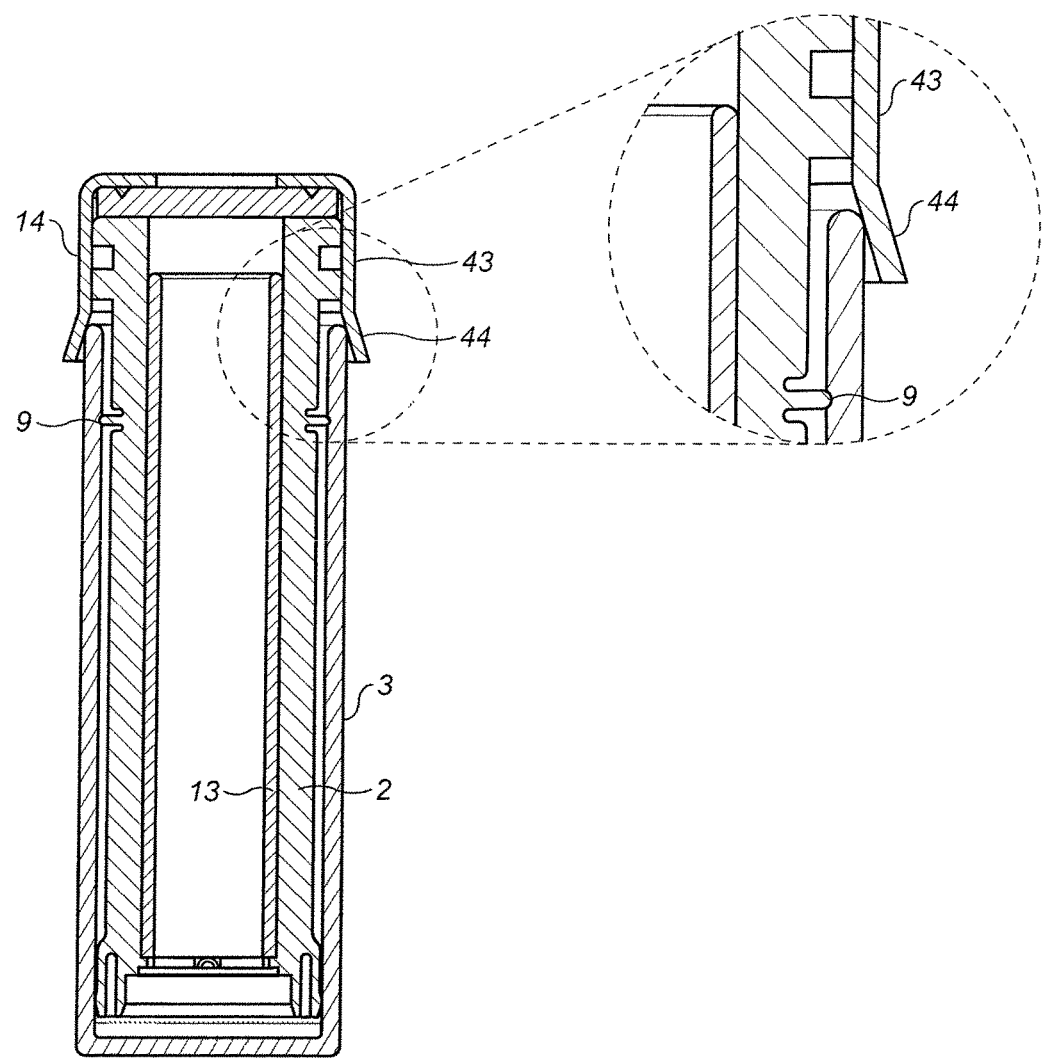
FIG. 8b shows a cross-sectional view of a cap seal for use in some embodiments of the present invention

FIG. 8b shows a further alternative means for sealing the vent hole 22, in the form of a cap seal 43. The cap seal 43 comprises a flexible skirted area 44 extending from the cap 14. This provides a wedge fit against the top of the filtrate receptacle 13 and creates a seal in this area when the plunger assembly 2 is fully depressed into the vial 3. Using a cap seal 43 that is formed as part of the cap 14 avoids the necessity to mould a seal into the plunger body 4. Further, since the seal is formed on the cap, it is less prone to mould variations, and to mould flash and parting lines, than a seal formed during moulding of the plunger body 4.

Although in FIGS. 8a and 8b, the chamber seal 10 and cap seal 43 are respectively shown being used in conjunction with the vent seal 9, in some embodiments, vent seal 9 is not used. Further, in some embodiments, the vent seal 9 may be used without the use of a chamber seal 10 or cap seal 43.

As mentioned above, the vial 3 may be made of a plastics material; although using a plastic vial means that the liquid sample 21a is held in contact with a plastics material prior to filtration, since the liquid sample 21a is typically inserted into the vial immediately prior to filtration, the amount of any resulting contamination may be relatively low. However, in order to further reduce contact between the liquid sample 21 and plastics material, in some embodiments of the present invention, a vial 3 made from an inert material such as glass is used. Glass vials however, typically have a larger variation in internal diameter between different vials, due to greater inaccuracies in the manufacturing processes than with plastic vials. When, due to these variations, a vial 3 having too large an internal diameter is used, this can result in too loose a fit between the plunger assembly 2 and the vial 3, allowing liquid to escape around the periphery of the plunger assembly 2 during depression of the plunger assembly 2. Conversely, when the internal diameter of the vial 3 is too small, the fit between the plunger assembly 2 and the vial 3 may be too tight, which may make depression of the plunger assembly 2 difficult, and/or cause the vial to break 3.

Accordingly, in some embodiments of the present invention, a liquid seal 8 is provided having a flexible portion, which can flex to vary in cross-section, thereby accommodating different vial 3 internal diameters, whilst maintaining sufficient rigidity to exert an outwards force on the internal wall of the vial, thereby maintaining an effective seal between the filter assembly 2 and the vial. The flexible portions are made of the same material as the plunger body 4, enabling them to be efficiently manufactured. The flexible portion has a thickness less than a thickness of a wall of the plunger body 4, so that the flexible portion can flex whilst the plunger body 4 remains rigid. Examples of such flexible sealing means are now described with reference to FIGS. 9a to 11b.

Figure 9A:
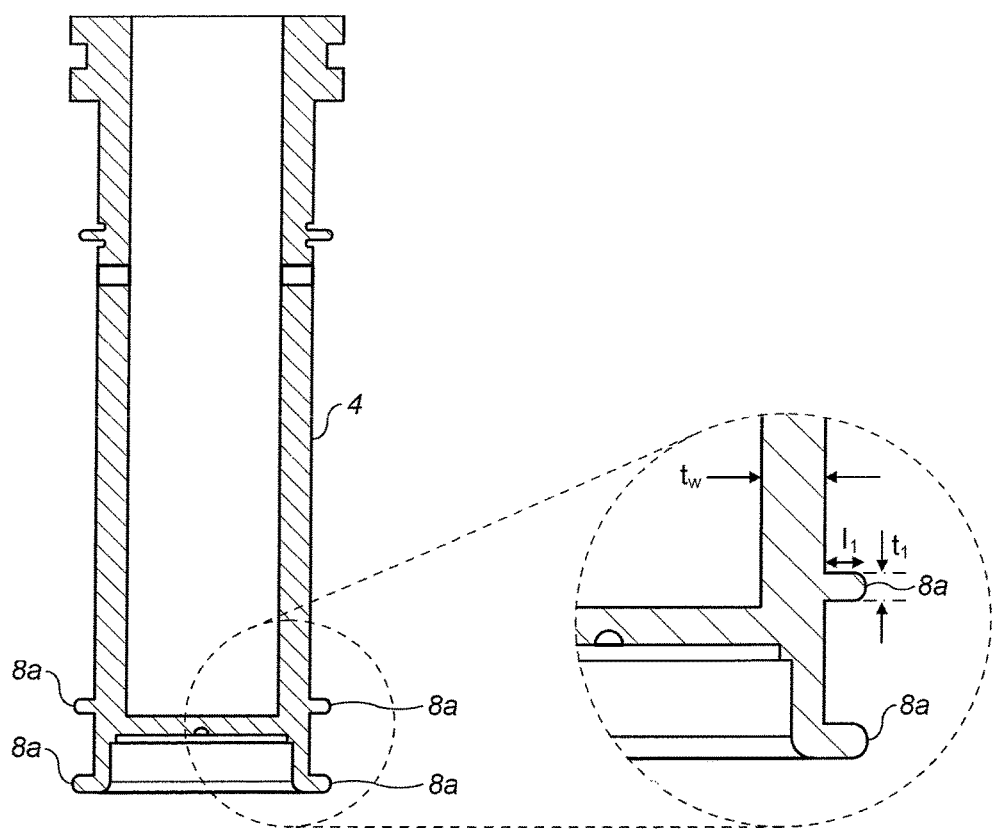
FIGS. 9a and 9b show cross-sectional views of a first type of liquid seal for use in some embodiments of the present invention.
Figure 9B:
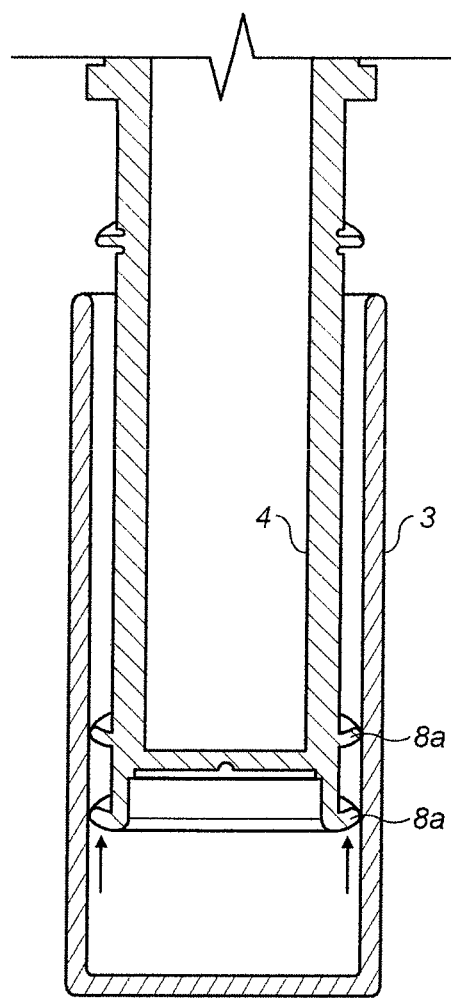

FIG. 9a shows a first liquid seal having a flexible portion in the form of one or more flexible ribs 8a located around the circumference of the plunger body 4. The flexible ribs 8a are arranged to be flexible so that, during insertion of the plunger body 4 into the vial 3, the flexible ribs 8a deflect upwards and inwards towards the plunger body 4, as shown in FIG. 9b, but also to be sufficiently rigid that when the flexible ribs 8a are deflected as shown in FIG. 9b, they exert an outward force on the internal walls of the vial 3, thereby maintaining a seal therewith. The rigidity of the ribs 8a can be adjusted by adjusting the length ($l_1$) or thickness ($t_1$) of the flexible rib 8a. The thickness ($t_1$) is arranged to be smaller than a thickness ($t_w$) of the walls of the plunger body 4 (the wall thickness $t_w$, typically being substantially uniform) so that the plunger body 4 remains rigid whilst the flexible rib 8a deflects. Although FIGS. 9a and 9b show a liquid seal comprising two flexible ribs 8a, in some embodiments of the present invention, only one flexible rib 8a is used; in other embodiments of the present invention, three or more flexible ribs 8a may be used.

Figure 10A:
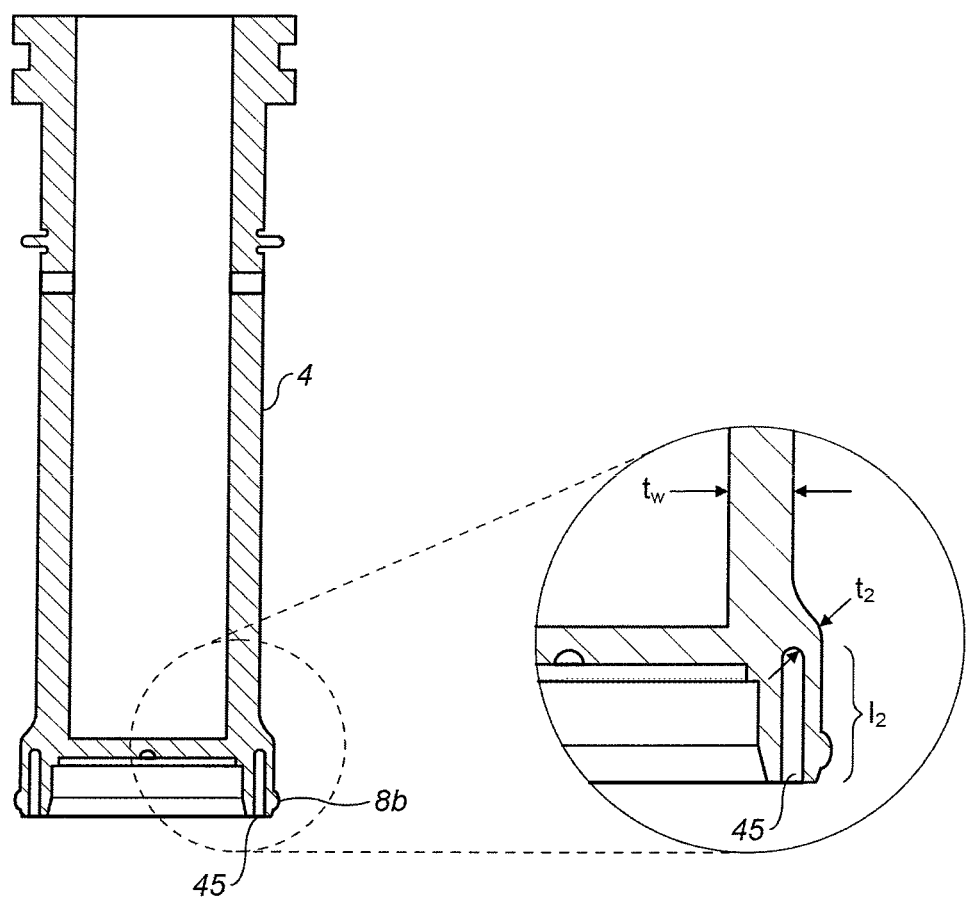
FIGS. 10a and 10b show cross-sectional views of a plunger body comprising a second type of liquid seal for use in some embodiments of the present invention.
Figure 10B:
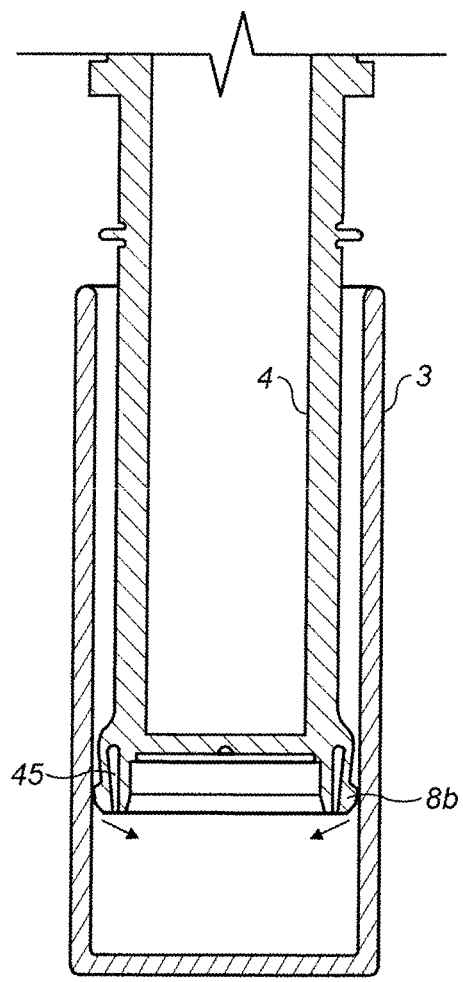

FIG. 10a shows a second liquid seal having a flexible portion in the form of a flexible skirt 8b located around the periphery of a recess 45 on the leading edge of the plunger body 4. When the plunger assembly 4 is inserted into the vial 3, the skirt 8b can flex inwards to match the internal diameter of the vial 3, as shown in FIG. 10b; as the skirt 8b flexes, it exerts an outward force on the interior wall of the vial 3, forming a seal. The rigidity of the skirt 8b can be adjusted by adjusting the length ($l_2$) or thickness ($t_2$) of the flexible rib 8a. The thickness ($t_2$) is typically arranged to be smaller than a thickness ($t_w$) of the walls of the plunger body 4 (the wall thickness $t_w$ typically being substantially uniform), so that the plunger body 4 remains rigid whilst the skirt 8b deflects inwards.

The flexible skirt 8b provides a greater area of contact between the seal 8b and the wall of the vial 3 than the flexible rib 8a described above with reference to FIGS. 9a and 9b, which provides a more effective sealing contact.

In addition, as the plunger body 4 is pushed into the vial 3, liquid is received in the recess 45, providing an outward pressure on the flexible skirt 8b, further improving the effectiveness of the seal formed by the flexible skirt 8b in contact with the inner wall of the vial 3. In this embodiment of the present invention, the strength of the liquid seal thus increases as the downward pressure exerted on the plunger assembly 4 is increased.

Figure 11A:
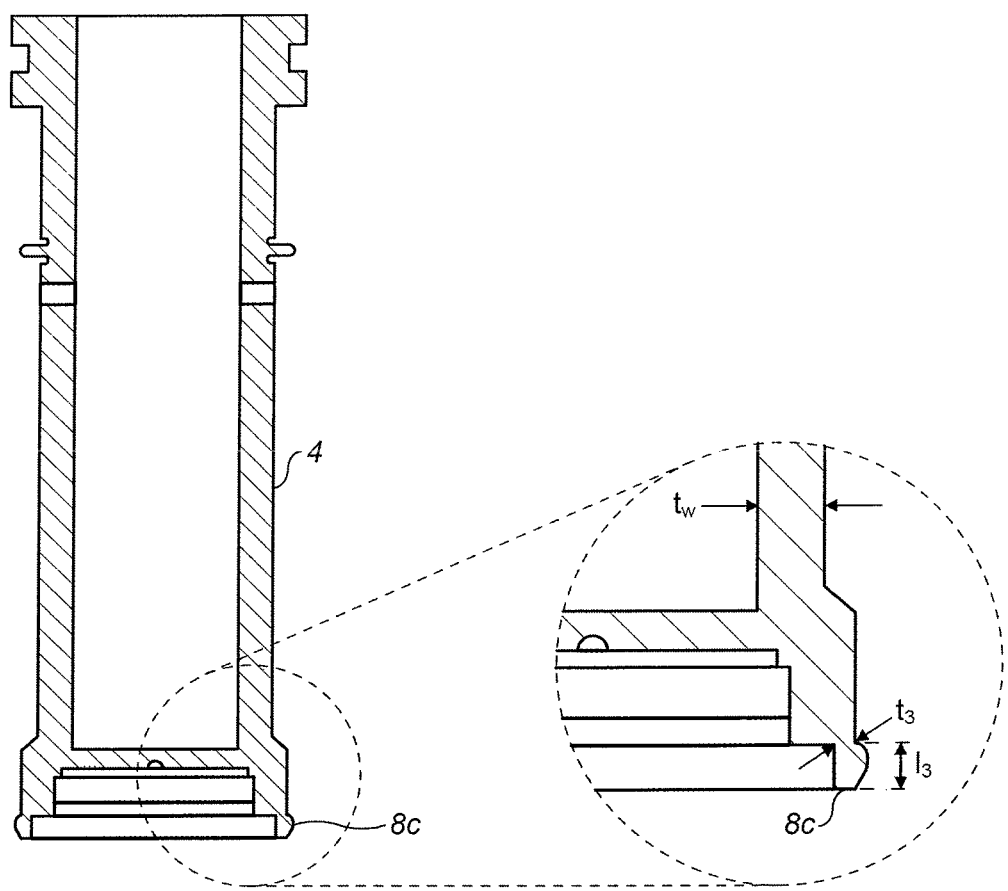
FIGS. 11a and 11b show cross-sectional views of a plunger body comprising a third type of liquid seal for use in some embodiments of the present invention.
Figure 11B:
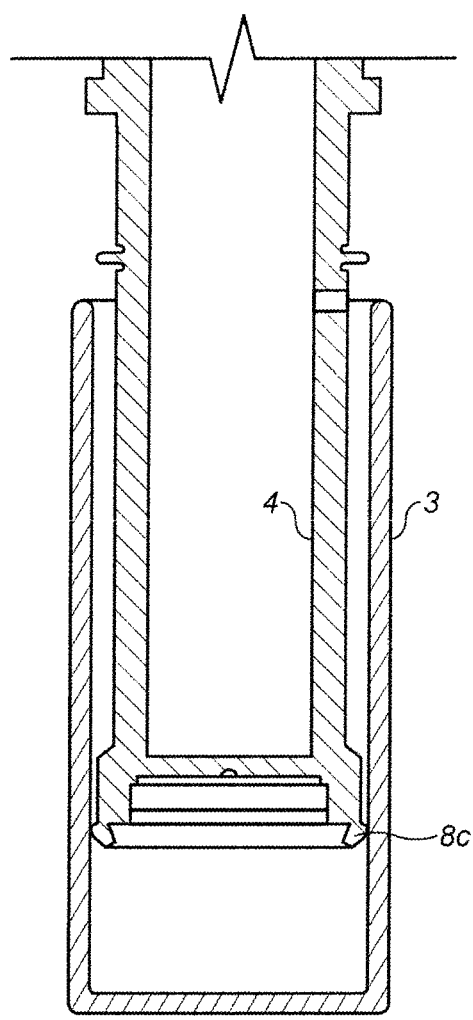

FIG. 11a shows a third liquid seal, also having a flexible portion in the form of a second flexible skirt 8c. In this embodiment, as the plunger assembly 2 is pushed into the vial 3, the second flexible skirt 8c twists (i.e. deflects) inwards to conform to the internal diameter of the vial 3, as shown in FIG. 11b; as the protrusion deflects, it exerts an outward force on the inner wall of the vial 3, thereby creating a seal. The rigidity of the second flexible skirt 8c can be adjusted by adjusting the length ($l_3$) or thickness ($t_3$) of the second flexible skirt 8c. The thickness ($t_3$) is typically arranged to be smaller than a thickness ($t_w$) of the walls of the plunger body 4 (the wall thickness $t_w$ typically being substantially uniform), so that the plunger body 4 remains rigid whilst the second flexible skirt 8c deflects inwards.

The second flexible skirt 8c provides a greater area of contact between the seal 8b and the wall of the vial 3 than the flexible rib 8a described above with reference to FIGS. 9a and 9b, which provides a more effective sealing contact.

In addition, in embodiments using the second flexible skirt 8c, no recess is required, simplifying the structure of the plunger body 4 and making it easier to manufacture than the embodiment described above with reference to FIGS. 10a and 10b.

In each of the examples described above with reference to FIGS. 9 to 11, the liquid seal 8 is formed integrally with the plunger body 4 (for example, during an injection moulding process). Further, each of the flexible portions described above extends either outwards from the plunger body (in the case of the flexible rib 8a) or downward from the plunger body (in the case of the flexible skirts 8b, 8c); accordingly, when injection moulding, the mould parts corresponding to flexible portions 8a, 8b, 8c extend away from the plunger body 4 in the direction of flow of the injected plastic, making the flexible portions 8a, 8b, 8c easy to manufacture integrally with the plunger body 4 using injection moulding, and mitigating any requirement for subsequent processing, such as cutting of the moulded part.

Figure 12:
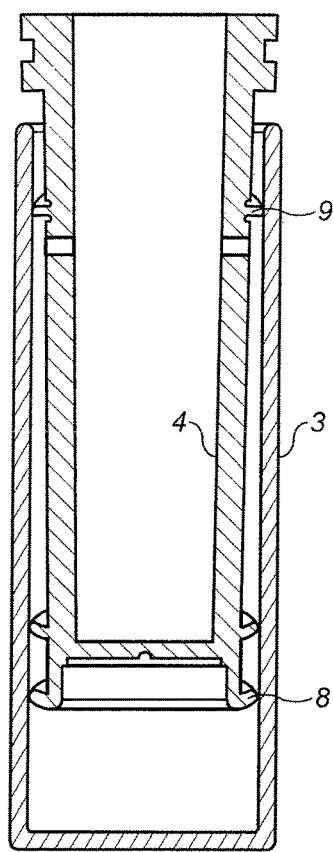
FIG. 12 shows a cross-sectional view of a tapered plunger body for use in some embodiments of the present invention.

Although the plunger body 4 may have substantially parallel walls, in some embodiments, the walls of the plunger body 4 may be tapered so as to narrow towards the aperture 5, as shown in FIG. 12. This facilitates engagement of the liquid seal 8 and vent seal 9, for the following reasons. As the plunger body 4 is inserted into the vial 3, it may be laterally offset away from the axis of the vial 3, or be inclined at an angle to the vial axis. This may result in the liquid seal 8 and/or the vent seal 9 fitting tightly with the vial 3 on one side, but fitting loosely on an opposing side; this may result in an ineffective seal contact. Tapering the plunger body 4 reduces the gap between the plunger body 4 and the vial at the top of the plunger body 4, reducing the scope for the lateral offset and/or leaning described above, thereby reducing the risk of a poor sealing contact.

Figure 13:
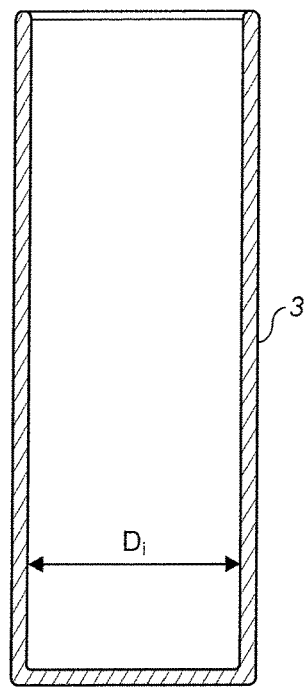
FIG. 13 shows cross-sectional views of a plunger body and liquid receptacle for use in some embodiments of the present invention.

As shown in FIG. 13, the outer walls of the plunger body 4 define a cross-sectional diameter $D_1$ at the bottom of the plunger body 4 which is less than the internal diameter $D_i$ of the vial 3, whereas the cross-sectional diameter $D_2$ defined by the seal 8, in an unflexed state, is greater than the internal diameter $D_i$ of the vial 3. This ensures that the plunger body 4 can be inserted into, and sit in, the vial 3, and that the liquid seal 8 flexes on insertion into vial 3, thereby forming a seal with the vial 3. Because plunger assemblies 2 using the liquid seals 8 described above can thus accommodate different vial 3 internal diameters, it is possible to use the plunger assembly 2 with vials 3 made from a material which has exhibits a relatively high variance in internal diameter from vial to vial, such as glass.

In some embodiments, the walls of the plunger body 4 do not have a cross-sectional diameter less than the internal diameter $D_i$ of the vial along the whole length of the plunger body 4; for example, in cases where the plunger body 4 is tapered, as described above with reference to FIG. 12, the plunger body walls at the top end of the plunger body 4 may define a cross-sectional diameter greater than the internal diameter of the vial 3, such that top end of the plunger body 4 remains outside the vial 3 when the plunger assembly 2 is fully depressed. The ridges 14a, which typically remain outside of the vial 3 when the plunger assembly 2 is fully depressed may also define a cross-sectional diameter greater than the internal diameter of the vial 3. Although the above discussion makes reference to "diameters" and thus assumes that the plunger body 4 and vial 3 are cylindrical, the skilled person will understand that similar considerations apply, mutatis mutandis, to other cross-sectional dimensions when the plunger body 4 and vial 3 have non-circular cross-sections (e.g. a side length in the case of a square cross-section etc.).

As mentioned above, the vial 3 may be made of glass; it may be manufactured using a glass blowing and/or grinding process.

Figure 14:
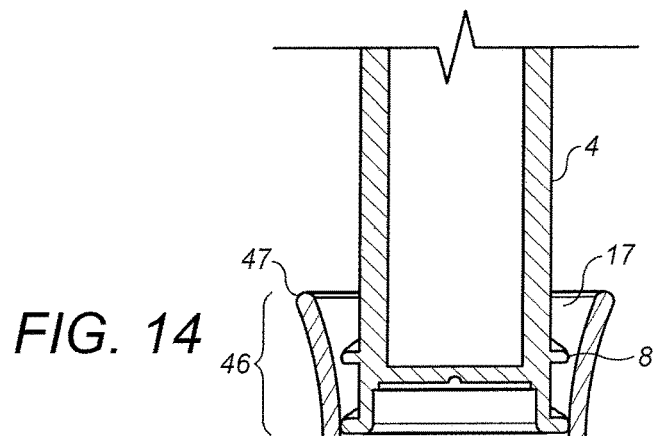
FIG. 14 shows a cross-sectional view of a liquid receptacle having a tapered portion for use in some embodiments of the present invention.

The vial 3 may comprise a tapered portion 46, so that the walls of the vial 3 taper outwards at the open end 17, as shown in FIG. 14. This ensures that the seal 8 engages with the vial 3 at a point below the rim 47 of the open end 17. This distributes the force exerted by the seal 8 over a larger effective area of the vial 3 than if the seal 8 were to engage at the rim 47. The tapered portion 46 thus protects against breakage of the vial 3.

Externally Fitting Filter Ring

As described above, the filter membrane 6 may be fixed in the aperture 5 by means of a retaining ring 7, which can be fitted by snap-fitting, interference fitting or ultrasonic welding, for example. However, the retaining ring 7 is typically small in size since it must fit inside the aperture 5, making it difficult to handle during assembly of the plunger assembly 2. Further, the internal fitting of the retaining ring 7 can be unreliable, resulting in the filter membrane 6 becoming dislodged, rendering the plunger assembly 2 ineffective.

Figure 15:
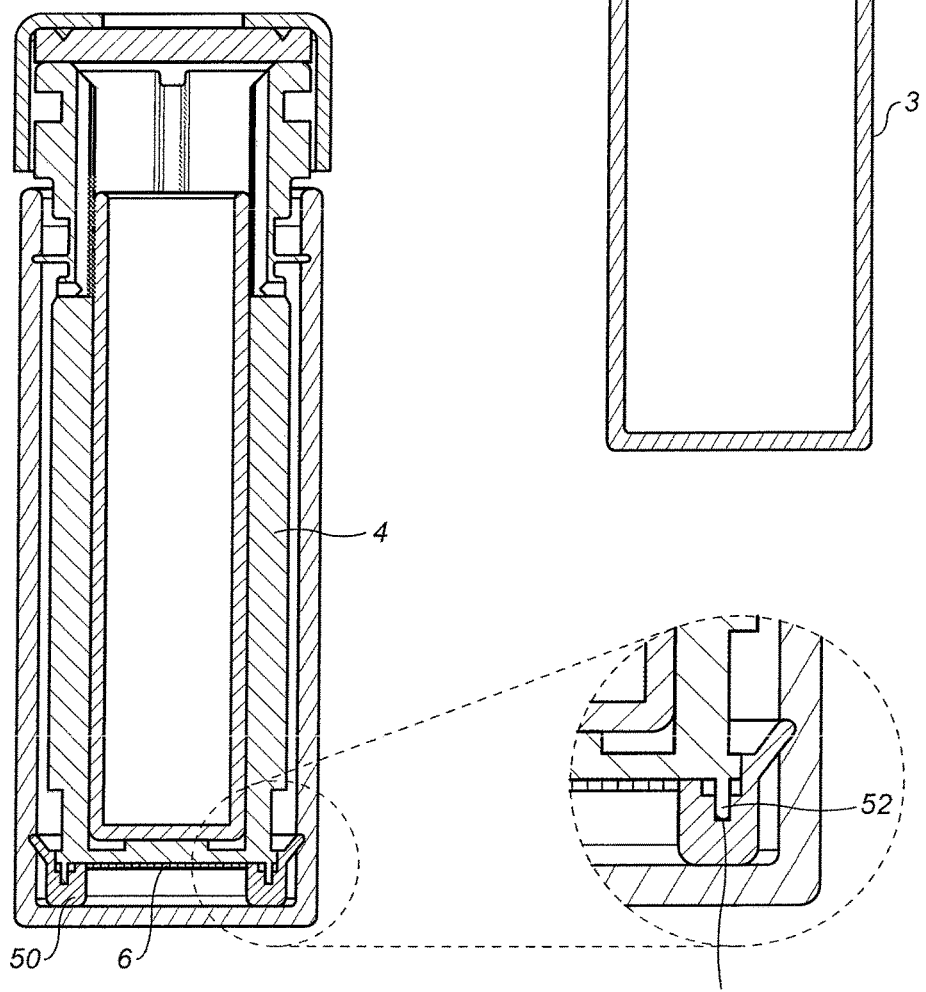
FIG. 15 shows a cross-sectional view of an externally fitting filter ring for use in some embodiments of the present invention.

FIG. 15 shows an end piece, which provides an alternative to the retaining ring 7, in the form of an externally fitting filter ring 50 (referred to herein, for conciseness, simply as an "external ring" 50), which fits externally to the plunger body 4; the external ring 50 is typically a moulded component formed of the same or similar material as the plunger body. The external ring 50 has a first locating means in the form of a locating recess 51 which engages with a corresponding second locating means, in the form of a locating boss 52, on the plunger body 4, thereby holding the filter membrane 6 in place. The external ring 50 includes an aperture 55 which aligns with the plunger body aperture 5 when the locating recess 51 is fitted on the locating boss 4a, so that, in use, liquid sample 21a can pass through the external ring aperture 7b, filter membrane 6 and plunger body membrane 5 into the chamber 12 of the plunger body 4.

The external ring 50 may be held in place on the boss 52 by an interference fit between the locating recess 51 and the boss 52. Alternatively or additionally, the external ring 50 may be permanently attached to the plunger body 4 by means of an adhesive and/or an ultrasonic weld. An exemplary method of ultrasonically welding the external ring 50 to the plunger body 4 is now described with reference to FIGS. 16a to 16c.

Figure 16A:
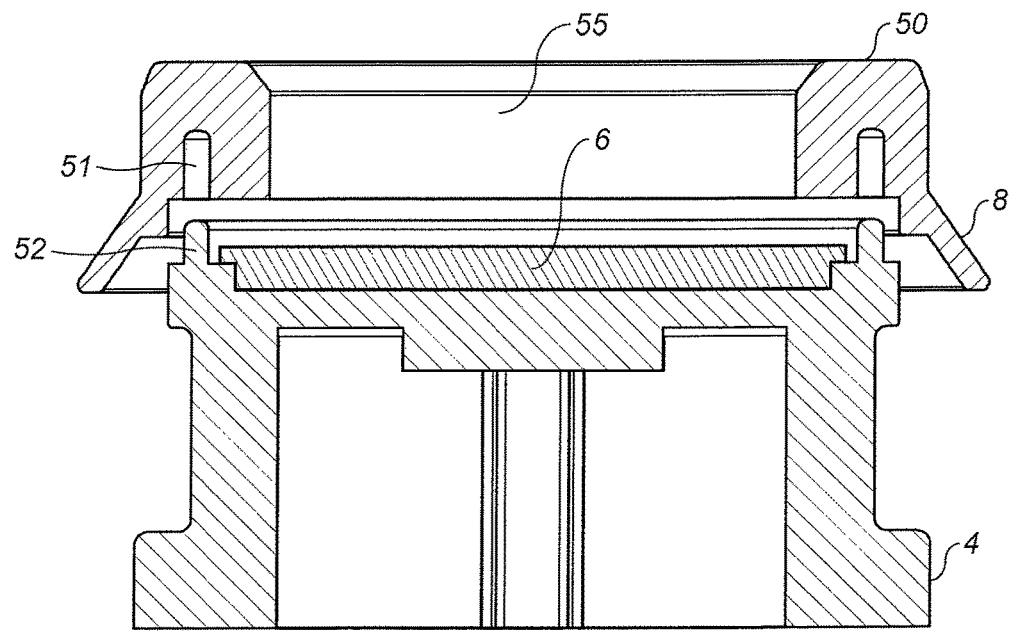
FIGS. 16a to 16c show cross-sectional views of the externally fitting filter ring being attached to a plunger body using an ultrasonic welding process.
Figure 16B:
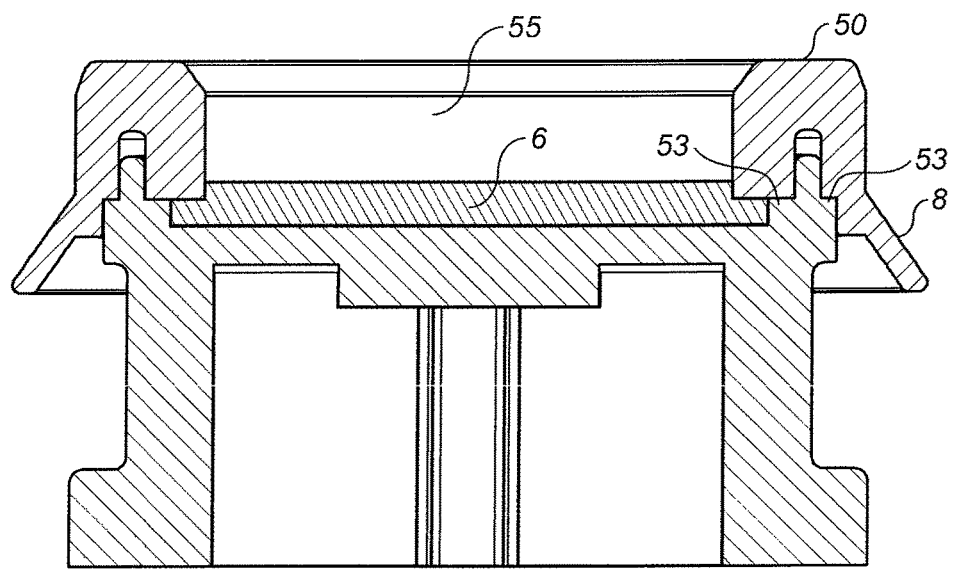
Figure 16C:
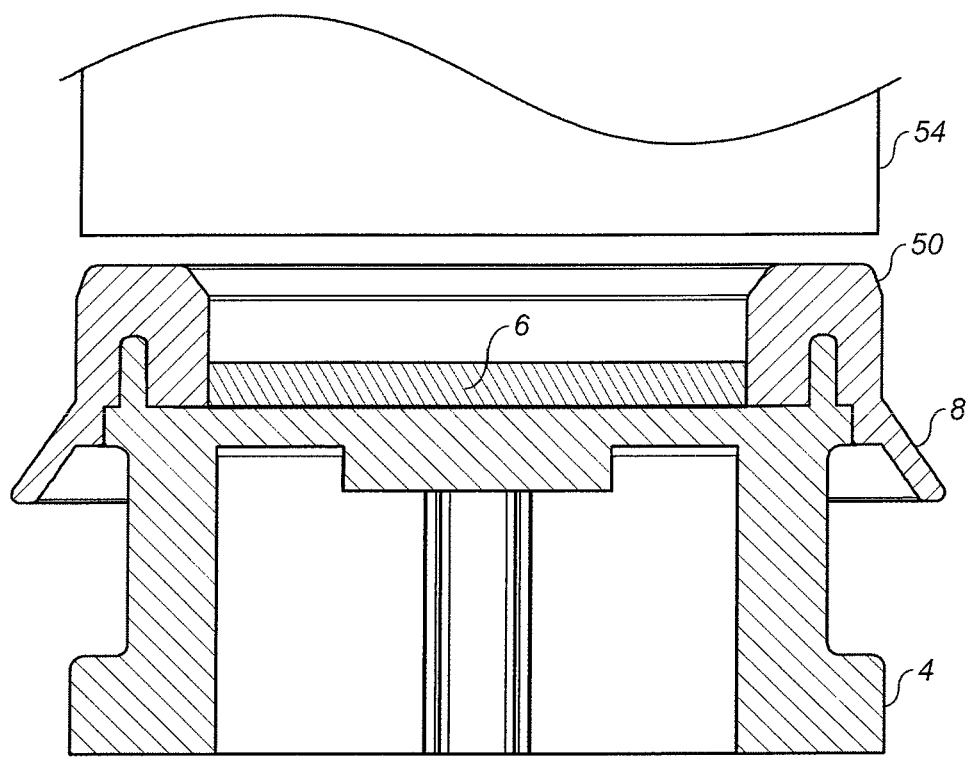

As shown in FIG. 16a, the filter membrane 6 is cut and placed onto the plunger body 4. The external ring 50 is then located on the plunger body 4 as shown in FIG. 16b. Energy directors in the form of annular protrusions 53 are located on either side of the boss 52; the external ring 50 is located on the plunger body 4 so that the external ring 50 sits on the annular protrusions 53. Finally, as shown in FIG. 16c an ultrasonic welding horn 54 is used to apply ultrasonic vibrations to the annular protrusions 53, causing them to melt, thereby permanently sandwiching the filter membrane 6 between the external ring 50 and the plunger body 4.

Since the external ring 50 is larger than a conventional internally fitting retaining ring 7, it is easier to handle during assembly of the plunger assembly 2. Further, the locating recess 51, in conjunction with the boss 52 on the plunger body 4 makes the external ring 50 considerably easier to locate than the conventional internally fitting retaining ring 7. Additionally, in the case that the external ring 50 is ultrasonically welded to the plunger body 4, since ultrasonic welds can be formed on both the interior and the exterior of the plunger body 4, the filter membrane 6 can be more securely held in place than is the case with the internally fitting retaining ring 7.

In the embodiments described above with reference to FIGS. 16a to 16c, the locating boss 52 is located on the plunger body 4 and the locating recess 51 is located on the external ring 50. However, in some embodiments, the plunger body 4 has a locating recess and the external ring has a locating boss. Alternatively or additionally, other locating means could be used; for example one of the first locating means and the second locating means could comprise a set of one or more holes with the other comprising a set of one or more corresponding stakes.

A further advantage of using the external ring 50 is that features such as the liquid seal 8 can be formed as part of the external ring 50. When the plunger body 4 and liquid seal 8 are integrally formed as part of a single mould, the parting line typically runs along the length of the plunger body 4 and therefore runs across the liquid seal 4; this can result in a protrusion or other uneven portion being formed on the liquid seal 8, reducing its effectiveness. However, when the liquid seal 8 is formed as part of the external ring 50 (and therefore separately to the plunger body 4), the parting line forms around the circumference of the external ring 50; accordingly, the parting line can be arranged so that it does not cross any part of the liquid seal 8, thereby improving the reliability of the liquid seal 8.

Figure 17:
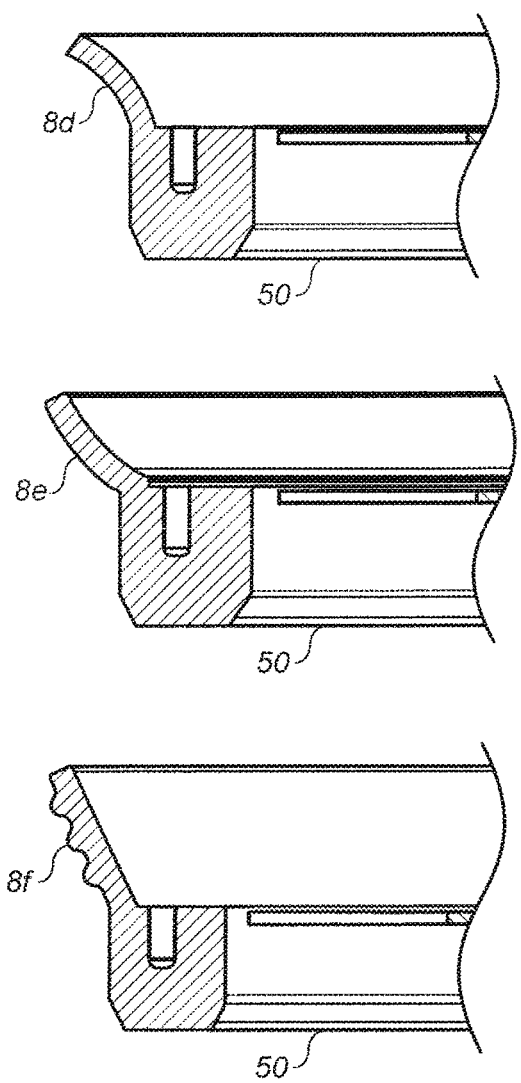
FIG. 17 shows cross-sectional views of three alternative filter fitting rings.

In addition, since liquid seals 8 having profiles that which extend away and upwards from the plunger assembly 2 are difficult to form as part of a single moulded plunger body, since the corresponding parts in the plastic mould extend in a direction away from the plastic flow. However, this problem does not arise in the case of a liquid seal 8 formed as part of external ring 50. Liquid seals 8d, 8e, 8f such as those shown in FIG. 17 can thus easily be formed as part of an external ring 50. Liquid seals 8 such as those shown in FIG. 17 may be advantageous when using vials with a consistent diameter from vial to vial (such as ground and/or polished glass vials). Alternatively, a liquid seal 8 as described above with reference to any of FIG. 9a to FIG. 11b may be formed as part of the external ring 50.

Figure 18:
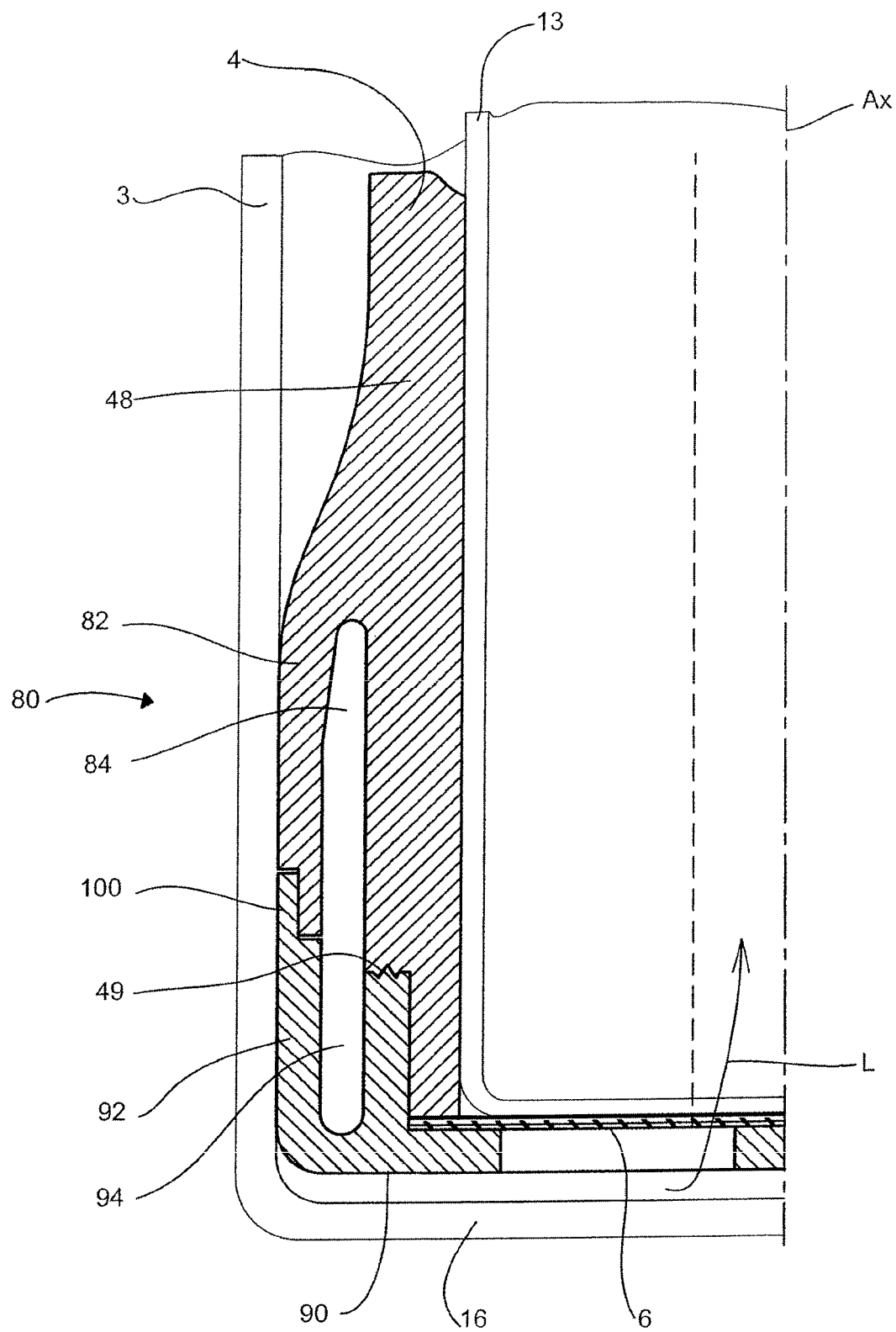
FIG. 18 shows a modified seal arrangement for use in the embodiments described below.

In FIG. 18 an alternative seal arrangement 80 is generally illustrated in section, showing only half of the arrangement, the other half being a mirror image about a central axis Ax. In this Figure, a liquid receptacle in the form of a glass vial 3, a plunger 4, a filter membrane 6 and closed tube filtrate chamber 13c are arranged generally as described above. The plunger 4 is shown close to the bottom of its intended travel, and near to the closed end 16 of the glass vial 3. The travel of the plunger 4 causes any liquids in the vial to flow in the direction of arrow L upward, through the filter 6, around the receptacle 13c and over the mouth (not shown) of the chamber 13c, in a manner similar to that shown in FIG. 12a. It will be noted that, in this arrangement, a majority of the liquids in the vial will forced upwardly, because the space occupied by the plunger matches substantially the internal volume of the vial at its closed end 16. Space for liquids to fill, which avoids their collection in the filtrate chamber 13c is known as dead space.

The arrangement of a plunger liquid seal 80 influences dead space. In this arrangement, the plunger 4 includes a body 48, and a first skirt 82 extending toward the closed end 16. The skirt 82, in this arrangement, is moulded plastics, integrally formed with the plunger body 48. There is an annular separation 84 between the skirt 82 and the body 48. This separation provides a resiliently deformable skirt which will inherently press against the side wall of the vial 3 and provide a seal because it has been manufactured to be slightly larger than the internal diameter of the vial 3.

In addition, the plunger body includes also a plunger cap 90, which is ultrasonically welded at an annular weld area 49. The cap 90 clamps the filter 6 in place when the cap is secured in place by said welding. The cap 90 includes a further (second) skirt 92 depending from the cap at an area close to the bottom of the plunger, and extending upwardly toward the first skirt. Again there is an annular separation 94 between the skirt 92 and the plunger body 48, which body includes the cap 90. The annular separation 94 allows further resilient sealing.

The skirts 82 and 92 overlap at an overlapping area 100. The skirts 82 and 92 have outer sealing surfaces which have no protrusions or recesses so together provide a generally constant annular surface which exert sealing forces on the side wall of the vial 3 spread over an area, rather than exerting point or line contact on the vial, and so reduce the stresses on the vial 3.

The above embodiments are to be understood as illustrative examples of the invention. Further embodiments of the invention are envisaged. For example, although the liquid seals 8 were described above as being formed integrally with the plunger body 4, in some cases they may be formed separately and subsequently attached to the plunger body 4 or other part of the plunger assembly 2. Additionally or alternatively, the liquid seals could be made of a different material (for example, a different plastics material) from the plunger body 4.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A filtration device for use with a liquid receptacle configured to hold a liquid sample, the liquid receptacle having a closed end for holding said liquid sample, the filtration device comprising:
   a plunger body made of a first material, the plunger body comprising an internal chamber;
   a filter material; and
   a filtrate receptacle within the internal chamber of the plunger body, the filtrate receptacle being made of a second material, the second material being different from the first material, wherein said second material comprises a glass material,
   wherein the filtration device is arranged to be slidably movable in the liquid receptacle so that the filter material moves towards said closed end of the liquid receptacle,
   wherein said movement causes liquid held in said liquid receptacle to pass through said filter material to the internal chamber of the plunger body, thereby filtering the liquid, the filtered liquid passing into said filtrate receptacle.

2. The filtration device of claim 1, wherein said second material is more inert than said first material.

3. The filtration device of claim 1, wherein said second material comprises a ceramic material.

4. The filtration device of claim 1, wherein the first material comprises a plastics material.

5. The filtration device of claim 1, wherein said filtrate receptacle comprises opposing open ends, at least one of the open ends being arranged to receive the filtered liquid sample from said filter material.

6. The filtration device of claim 5, wherein the filtrate receptacle comprises a hollow cylinder open at each end.

7. The filtration device of claim 1, comprising one or more conduits, the one or more conduits being fluidly connected to said filter material to receive filtered liquid sample therefrom, the one or more conduits being arranged such that filtered liquid passing therethrough is collected in said filtrate receptacle.

8. The filtration device of claim 7, wherein the one or more conduits comprises a tube extending in the interior of the filtrate receptacle.

9. The filtration device of claim 8, wherein the filtrate receptacle is substantially cylindrical, and the tube extends along an axis of the filtrate receptacle.

10. The filtration device of claim 7, wherein the filtrate receptacle comprises an open end and an opposing closed end, the closed end being located facing said filter material, and the one or more conduits extend around a periphery of the filtrate receptacle, thereby fluidly connecting the filter material to said open end.

11. The filtration device of claim 10, wherein said one or more conduits comprise one or more channels in an internal wall of the plunger body.

12. The filtration device of claim 11, wherein each of said one or more channels comprises an opening arranged to provide liquid to said filtrate receptacle during said movement, the opening being angled inward from the internal wall so as to direct liquid towards the open end of the filtrate receptacle.

13. The filtration device of claim 12, comprising a stop portion extending inwards from said internal wall of the plunger body, the stop portion being arranged to limit movement of the filtrate receptacle within said internal chamber, so as to prevent the open end of the filtrate receptacle moving past the stop portion, wherein said stop portion comprises said opening.

14. The filtration device of claim 1, wherein the plunger body comprises an aperture, the filter material being located at the aperture.

15. The filtration device of claim 14, comprising:
   a cap at an end opposing said aperture, the cap being arranged to provide an air-tight seal to prevent air from passing from said interior chamber to the exterior of the plunger body; and
   a vent hole connecting said internal chamber with the exterior of the plunger body, such that air may escape from said internal chamber during said movement.

16. The filtration device of claim 15, comprising a channel extending in a wall of said internal chamber from a first position inside said internal chamber to said vent hole, the first position being more proximal to the cap than the vent hole.

17. The filtration device of claim 1, wherein said plunger assembly comprises a sealing means for forming a seal between the plunger assembly and the liquid receptacle during said movement, the seal preventing liquid passing around a periphery of the plunger assembly during said movement.

18. The filtration device of claim 17, wherein said sealing means comprises a flexible portion, said flexible portion being capable of flexing on insertion into said liquid receptacle to correspond to an internal cross-section of said liquid receptacle, the flexible portion exerting an outward force on an internal wall of the liquid receptacle during said movement, thereby forming said seal.

19. The filtration device of claim 18, wherein said flexible portion comprises a flexible rib extending outwards from the plunger body, the flexible rib being capable of deflecting longitudinally relative to the plunger body, and inwards towards the plunger body during said movement.

20. The filtration device of claim 18, wherein said flexible portion comprises a flexible skirt extending downwards from an end of the plunger body, the skirt being deflectable inwards.

21. The filtration device of claim 20, wherein said skirt forms a wall of a recess portion, the recess portion being arranged to receive liquid during said movement, the received liquid exerting an outward force on said skirt.

22. A filtration apparatus comprising the filtration device of claim 1 and a liquid receptacle.

23. The filtration apparatus of claim 22, wherein said liquid receptacle is made from a glass material.

24. The filtration apparatus of claim 22, wherein the liquid receptacle is comprises an open end through which at least part of said plunger assembly may pass, and said open end comprises a tapered portion.

25. A method of filtering a liquid, comprising:
inserting a liquid sample into a liquid receptacle;
inserting a filtration device into the liquid receptacle, the filtration device comprising a plunger body and a filter material, the plunger body being made of a first material and comprising an internal chamber; and
depressing the plunger body into the liquid receptacle, thereby causing the inserted liquid sample to pass through said filter material and into a filtrate receptacle located in said internal chamber, the filtrate receptacle being made of a second material, the second material being different from the first material, wherein said second material comprises a glass material.

* * * * *